(12) United States Patent
Kaizu et al.

(10) Patent No.: US 9,800,806 B2
(45) Date of Patent: *Oct. 24, 2017

(54) IMAGE PROCESSING DEVICE THAT GENERATES AN IMAGE FROM PIXELS WITH DIFFERENT EXPOSURE TIMES

(71) Applicant: SONY CORPORATION, Tokyo (JP)

(72) Inventors: Shun Kaizu, Tokyo (JP); Tomoo Mitsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,276

(22) Filed: Aug. 1, 2016

(65) Prior Publication Data

US 2016/0344954 A1    Nov. 24, 2016

Related U.S. Application Data

(63) Continuation of application No. 14/326,963, filed on Jul. 9, 2014, now Pat. No. 9,432,595, which is a continuation of application No. 13/399,222, filed on Feb. 17, 2012, now Pat. No. 8,797,433.

(30) Foreign Application Priority Data

Feb. 24, 2011  (JP) .................................. 2011-038240

(51) Int. Cl.
| | |
|---|---|
| *H04N 5/353* | (2011.01) |
| *H04N 5/355* | (2011.01) |
| *H04N 5/235* | (2006.01) |
| *H04N 5/378* | (2011.01) |

(52) U.S. Cl.
CPC ......... *H04N 5/3535* (2013.01); *H04N 5/2353* (2013.01); *H04N 5/35554* (2013.01); *H04N 5/378* (2013.01)

(58) Field of Classification Search
CPC .................................................. H04N 5/35554
USPC ..................... 348/296, 208.4, 241
See application file for complete search history.

(56) References Cited

U.S. PATENT DOCUMENTS

| | | |
|---|---|---|
| 8,390,698 B2 | 3/2013 | Shimizu et al. |
| 2008/0284873 A1 | 11/2008 | Miyanari |
| 2010/0026823 A1 | 2/2010 | Sawada |
| 2010/0053346 A1 | 3/2010 | Mitsunaga |
| 2010/0053349 A1 | 3/2010 | Watanabe et al. |
| 2012/0038793 A1 | 2/2012 | Shimizu et al. |

(Continued)

FOREIGN PATENT DOCUMENTS

| | | |
|---|---|---|
| JP | 2004-140149 A | 5/2004 |
| JP | 2004-140479 A | 5/2004 |
| JP | 2006-148496 A | 6/2006 |

(Continued)

*Primary Examiner* — Antoinette Spinks
(74) *Attorney, Agent, or Firm* — Chip Law Group

(57) ABSTRACT

An image processing apparatus includes an intermediate image generating unit configured to input an image which has been shot with differing exposure times set by region, generates a plurality of exposure pattern images corresponding to differing exposure times based on the input image, and generates a plurality of timing images which are difference images of the plurality of exposure pattern images; and a distortion correction processing unit configured to generate a corrected image equivalent to an exposure processing image at a predetermined exposure time by synthesizing processing of the plurality of timing images.

10 Claims, 26 Drawing Sheets

(56) References Cited

U.S. PATENT DOCUMENTS

2012/0218426 A1    8/2012   Kaizu et al.
2012/0281111 A1    11/2012   Jo et al.

FOREIGN PATENT DOCUMENTS

| | | |
|---|---|---|
| JP | 2006-253876 A | 9/2006 |
| JP | 2007-208580 A | 8/2007 |
| JP | 2007-336314 A | 12/2007 |
| JP | 2008-147818 A | 6/2008 |
| WO | 2006/049098 A | 5/2006 |

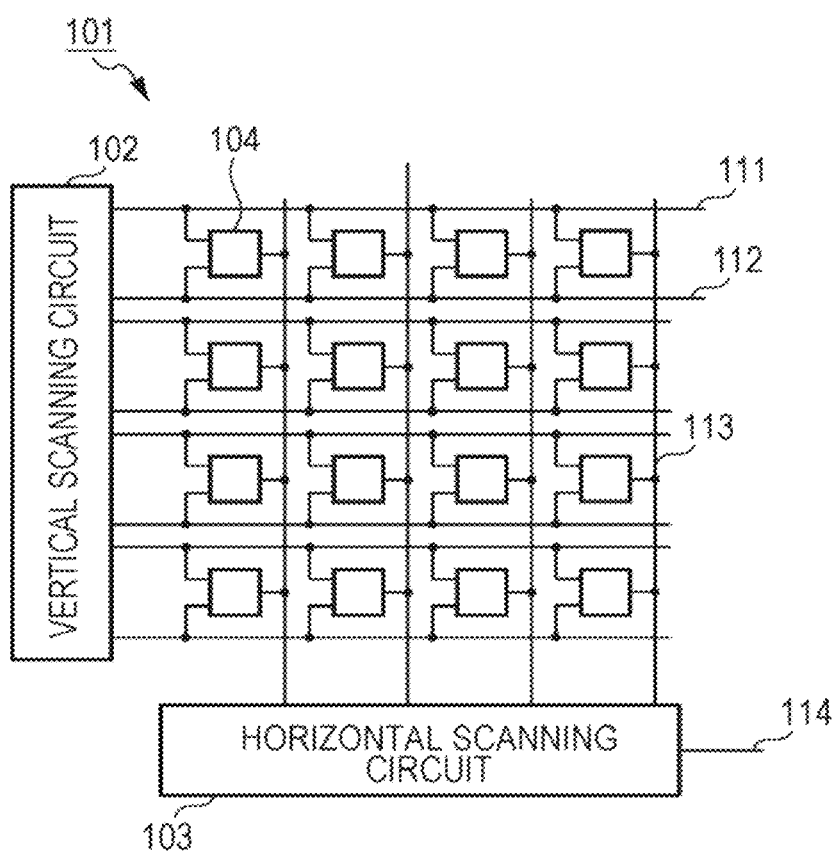

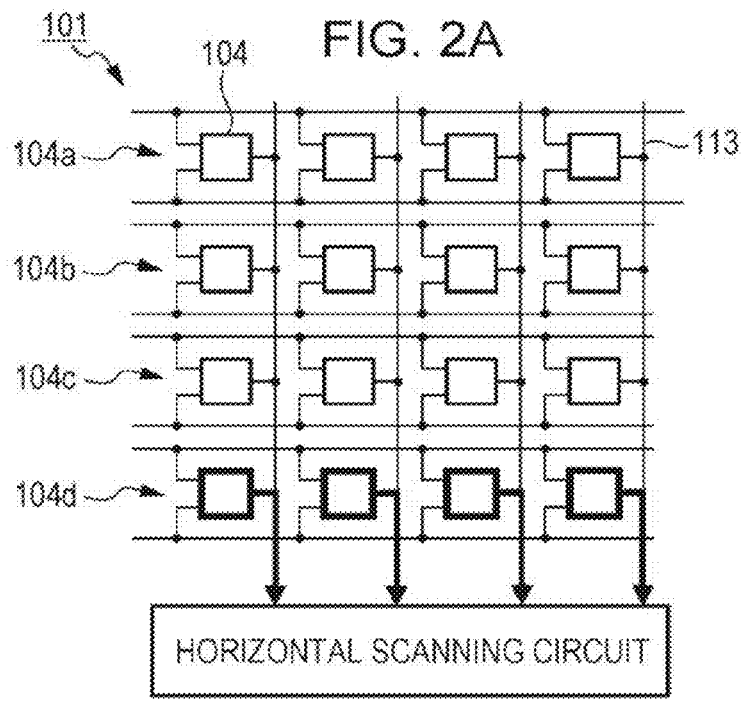
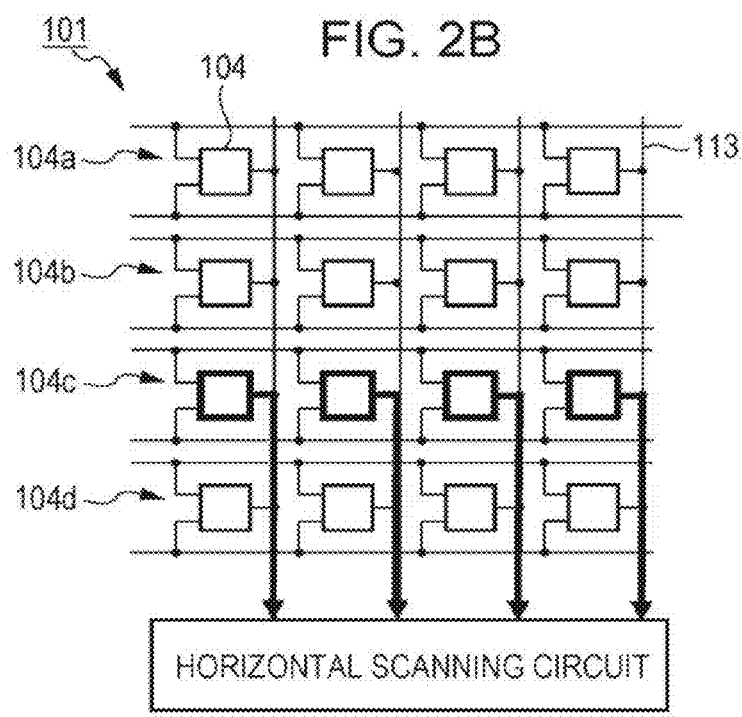

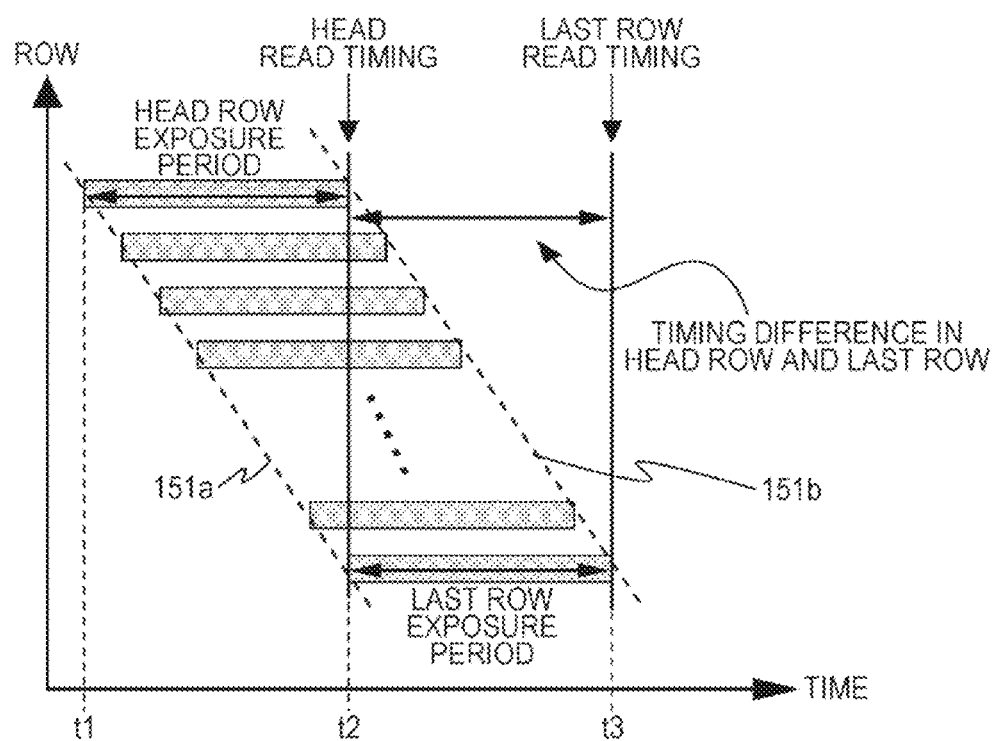

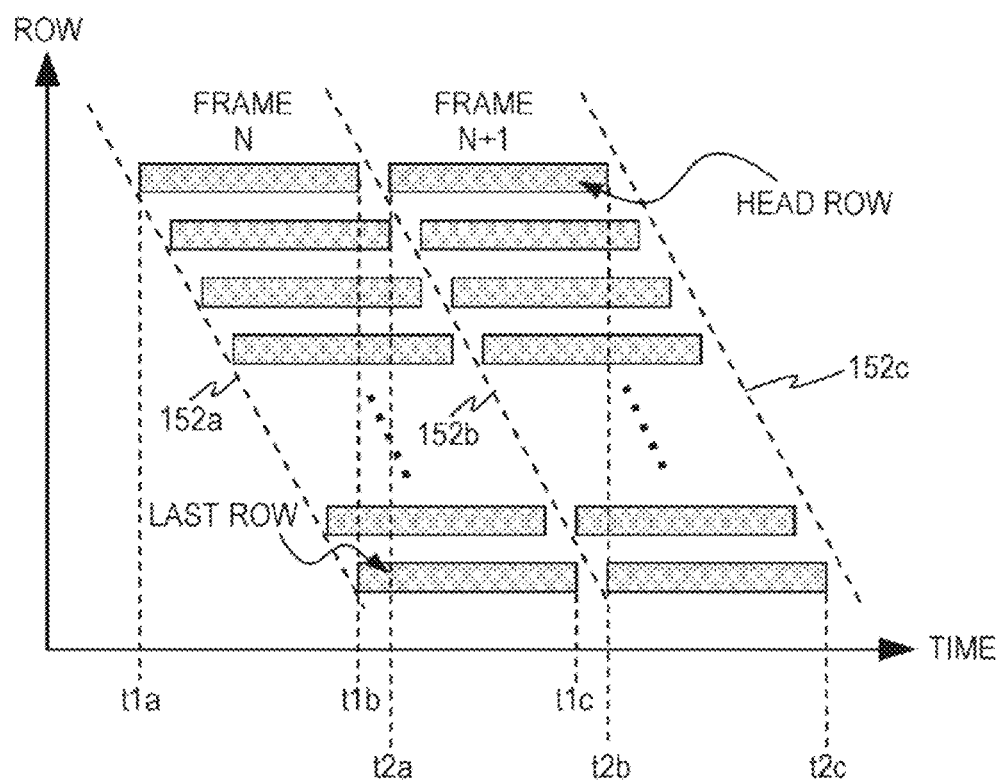

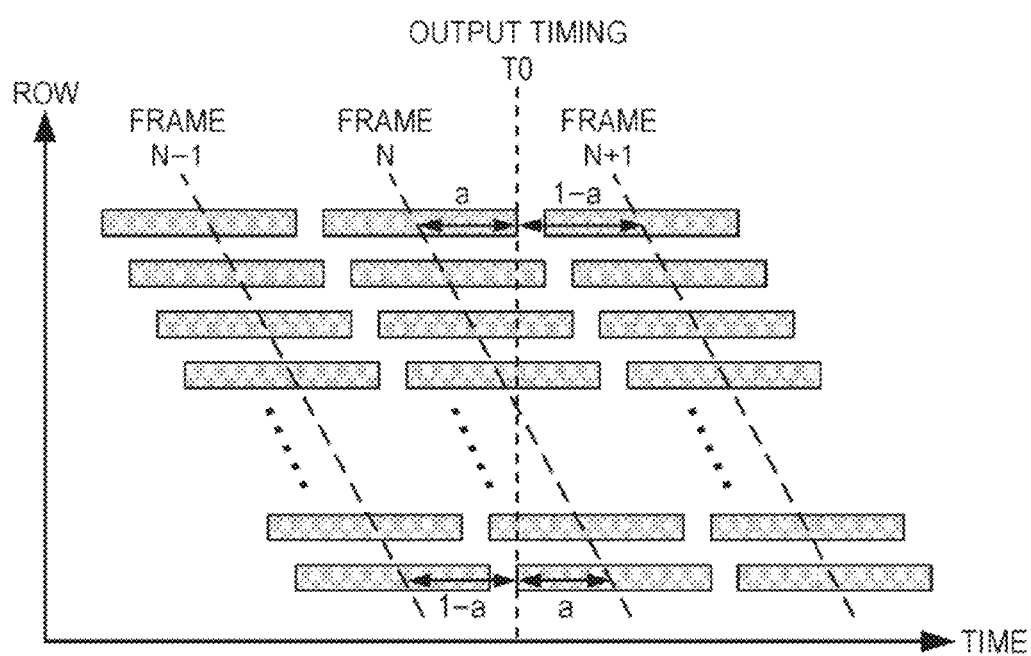

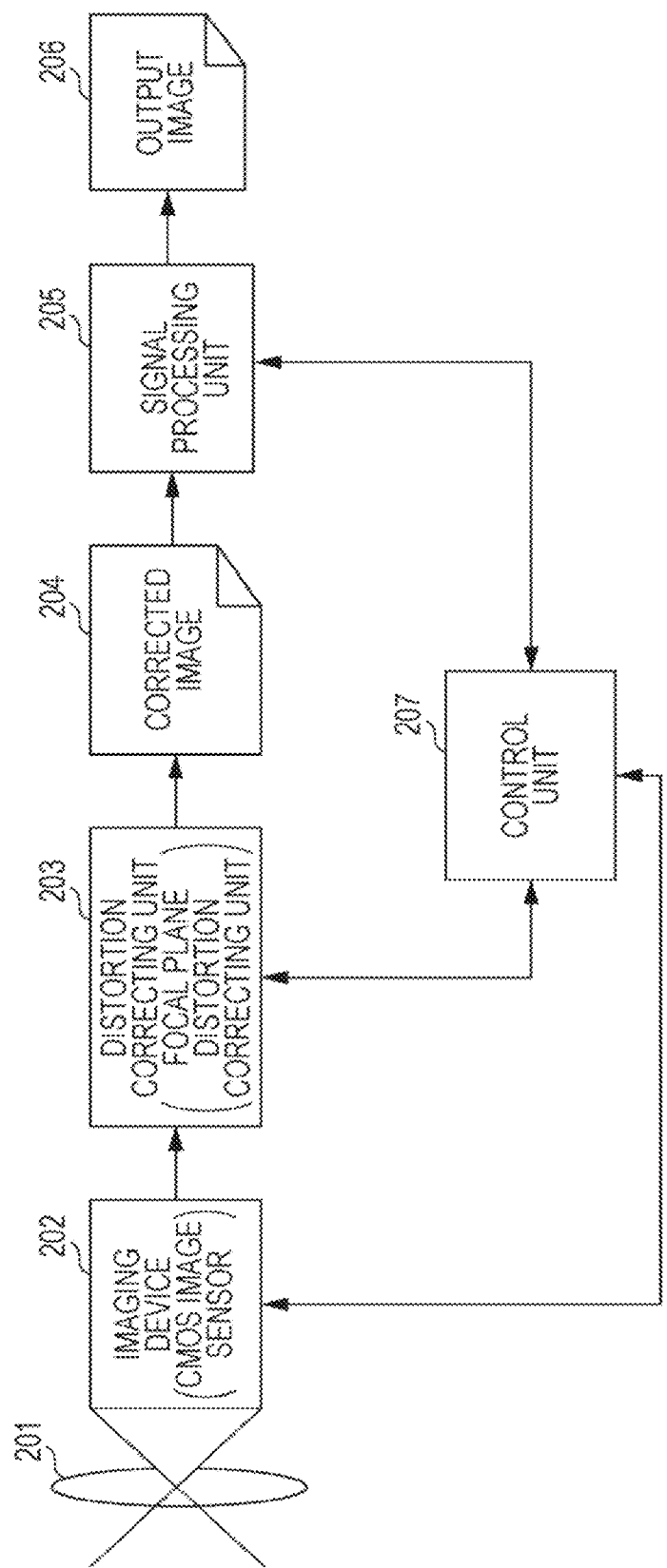

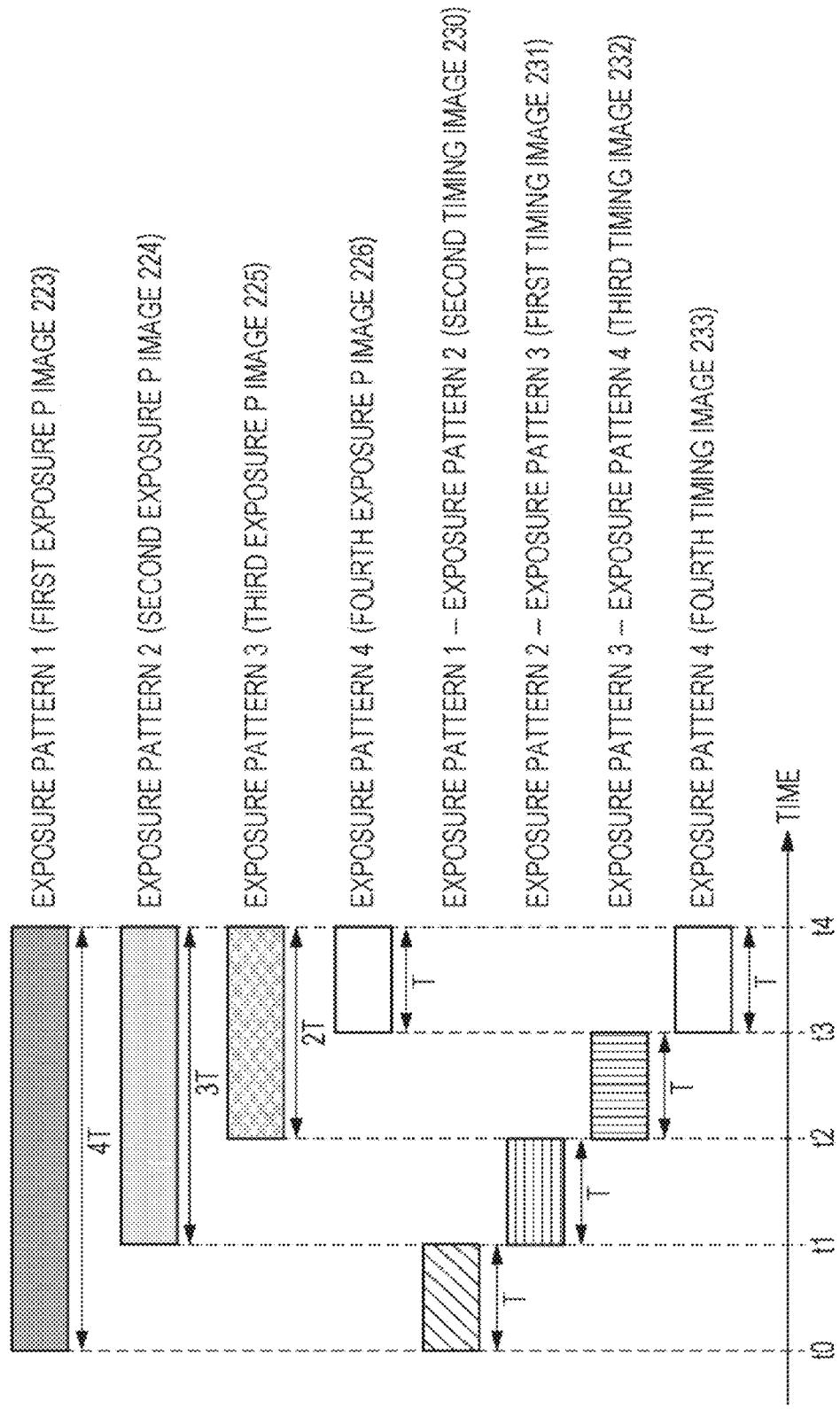

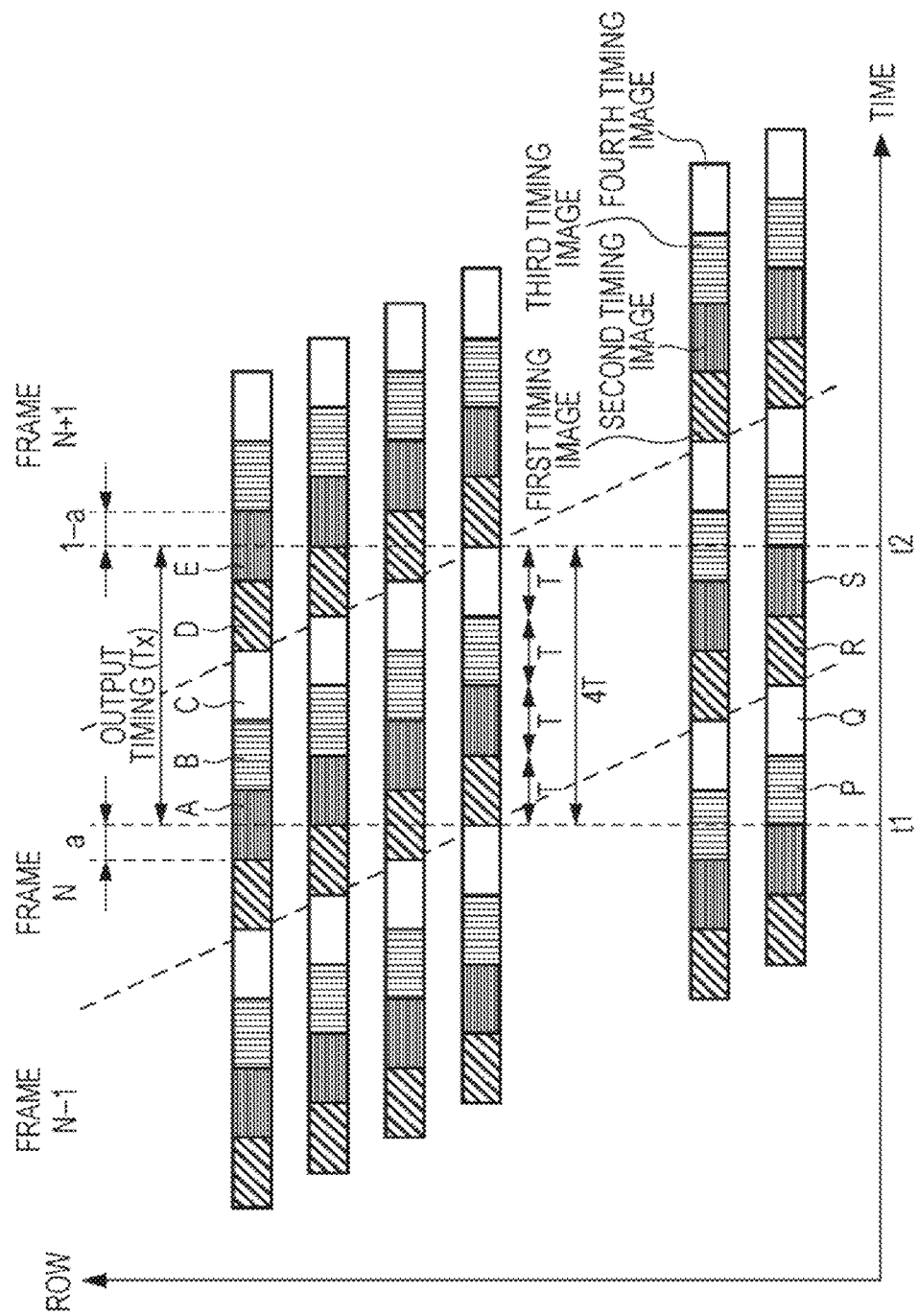

FIG. 14A

☐ EXPOSURE PATTERN 1
☐ EXPOSURE PATTERN 2

| G | R | W | B | G | R | W | B |
|---|---|---|---|---|---|---|---|
| R | W | B | G | R | W | B | G |
| W | B | G | R | W | B | G | R |
| B | G | R | W | B | G | R | W |
| G | R | W | B | G | R | W | B |
| R | W | B | G | R | W | B | G |
| W | B | G | R | W | B | G | R |
| B | G | R | W | B | G | R | W |

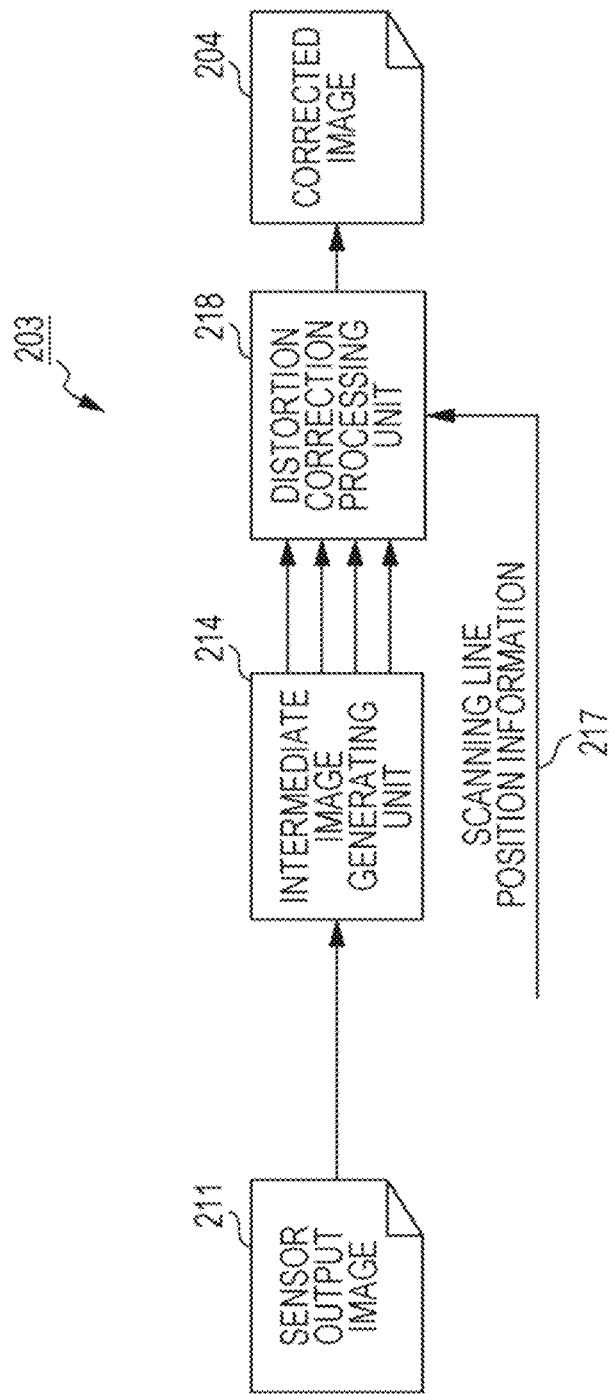

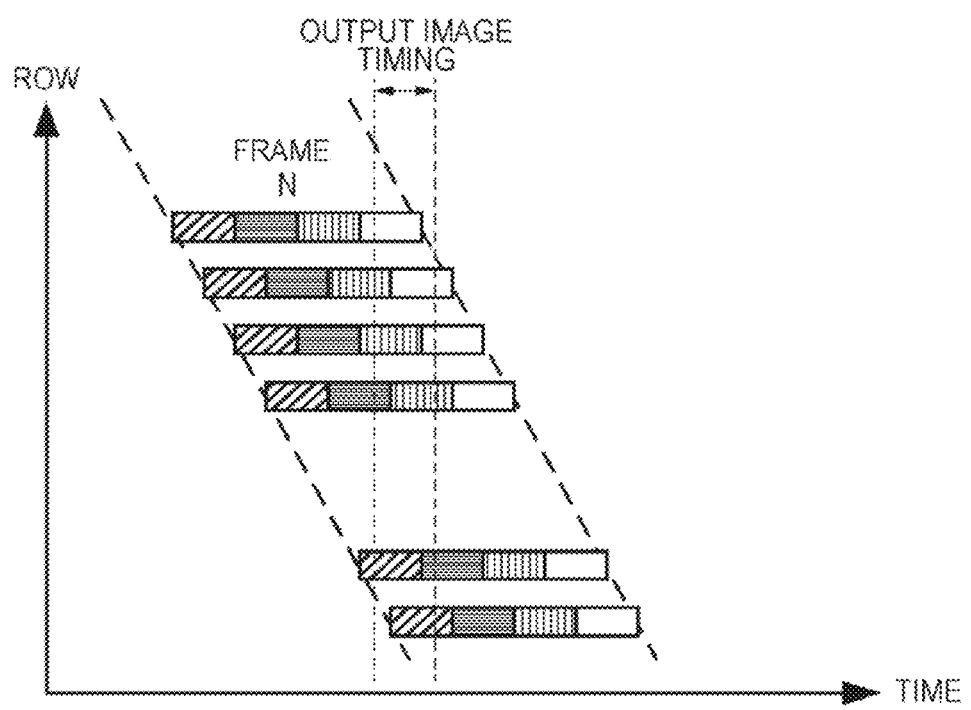

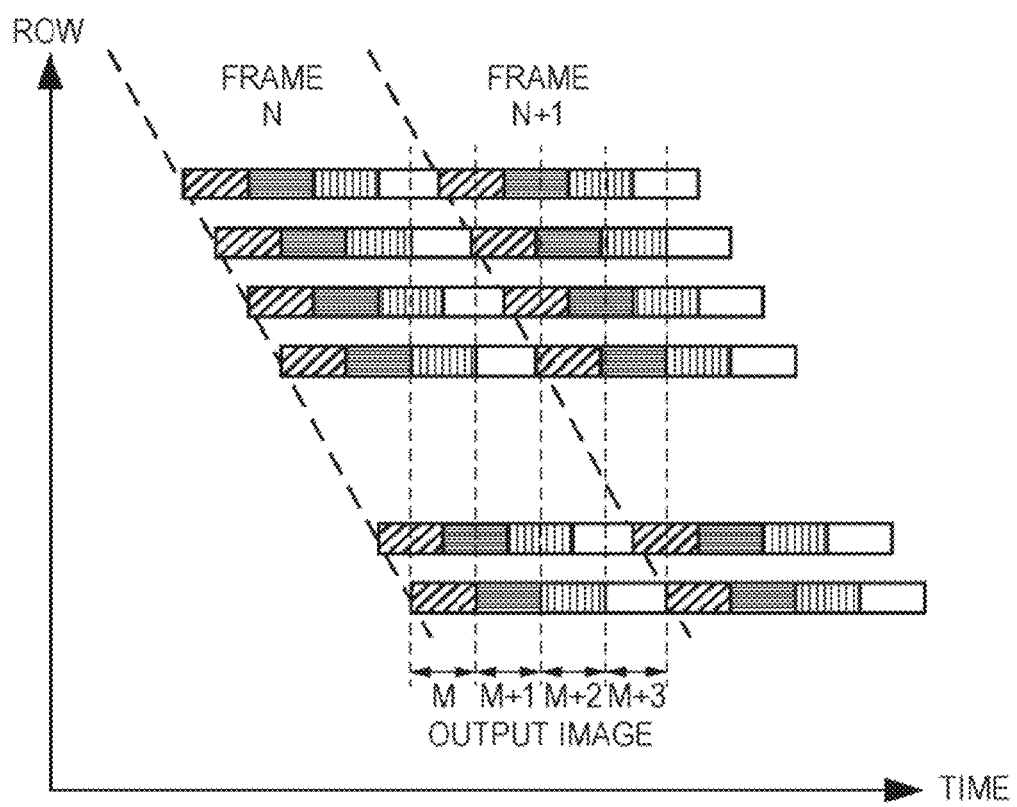

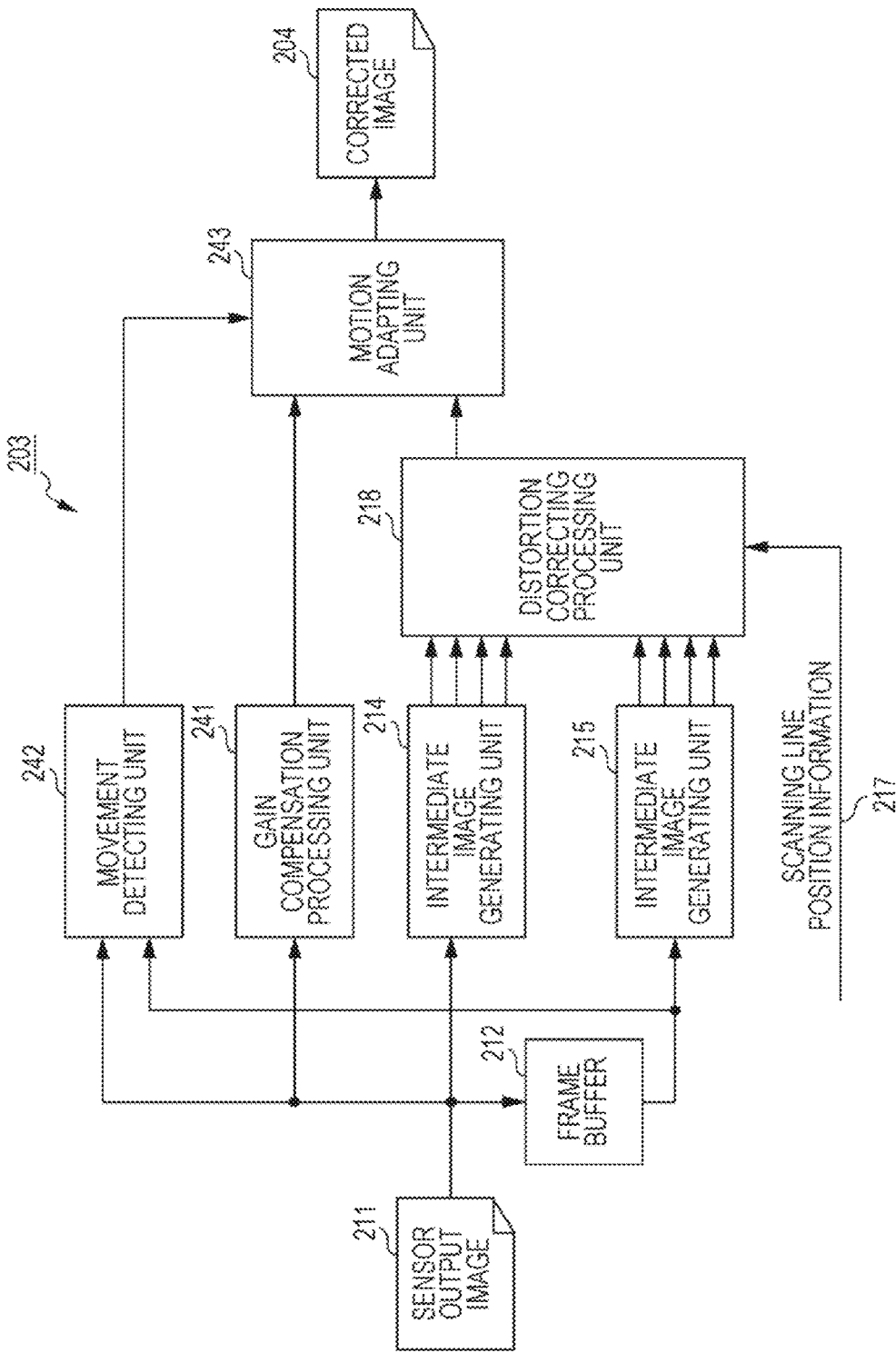

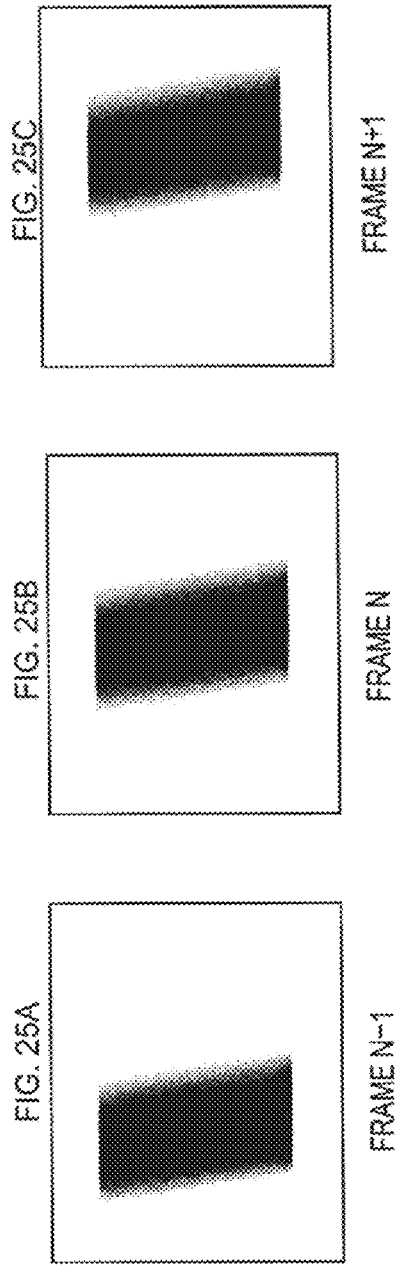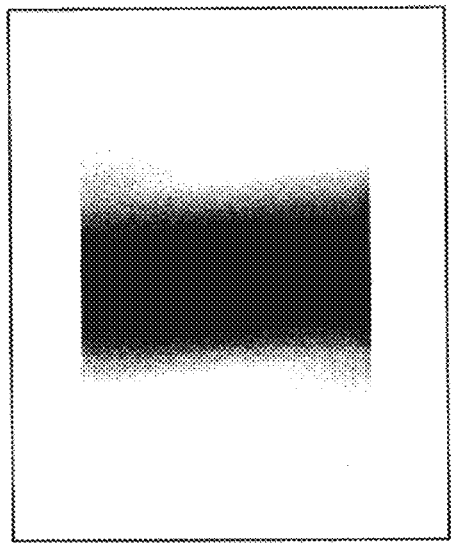

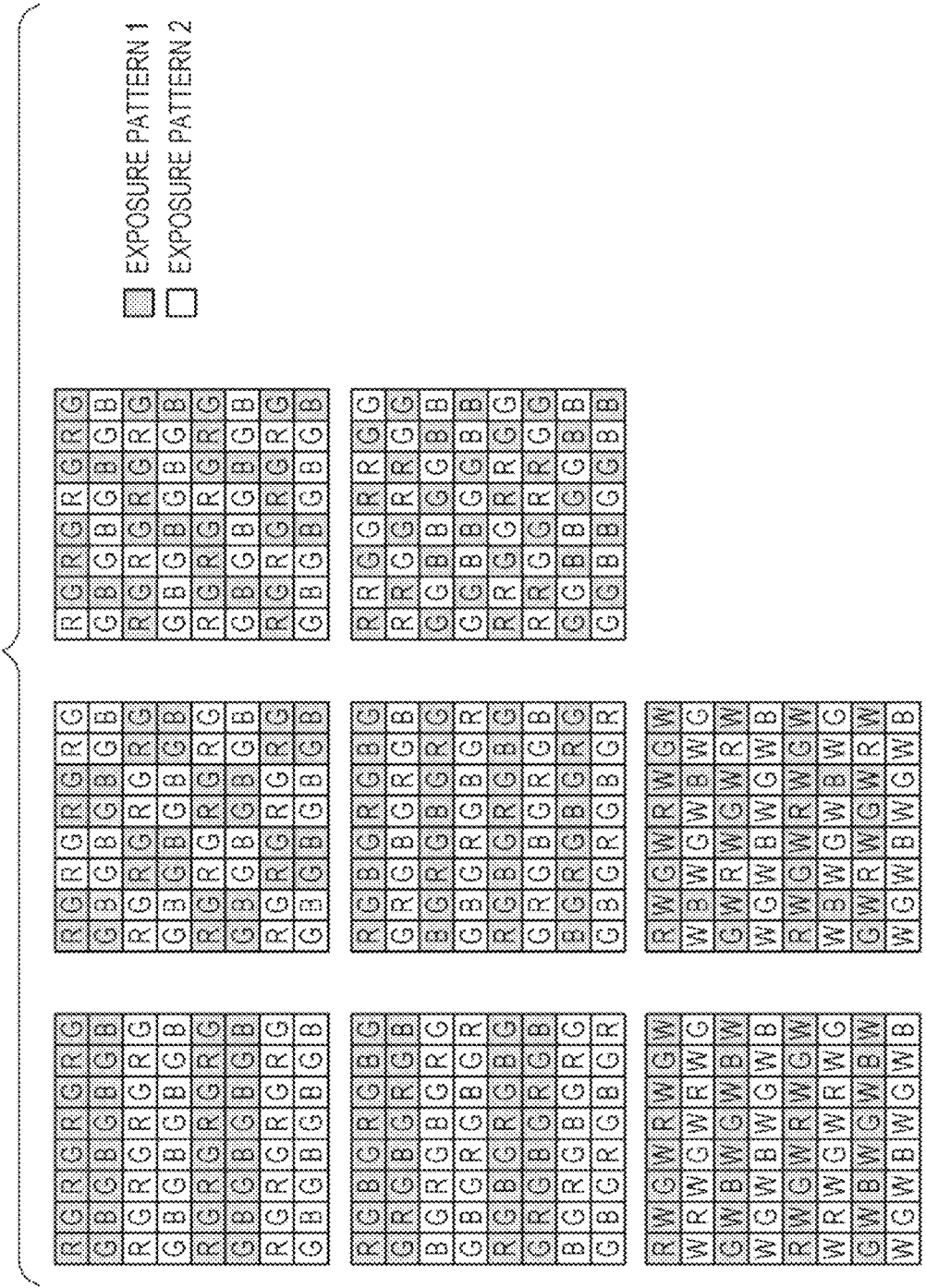

IMAGE PROCESSING DEVICE THAT GENERATES AN IMAGE FROM PIXELS WITH DIFFERENT EXPOSURE TIMES

CROSS REFERENCE TO RELATED APPLICATIONS

The present application is a continuation application of U.S. application Ser. No. 14/326,963 filed Jul. 9, 2014, which is a continuation application of U.S. application Ser. No. 13/399,222 filed Feb. 17, 2012 now U.S. Pat. No. 8,797,433 issued Aug. 5, 2014, and claims the priority from prior Japanese Priority Patent Application JP 2011-038240 filed in the Japan Patent Office on Feb. 24, 2011, the entire contents of each of which are incorporated herein by reference.

BACKGROUND

The present disclosure relates to an image processing apparatus and image processing method and program, and more specifically, it relates to an image processing apparatus and image processing method and program wherein pixel value reading of a shot image is executed as sequential readout processing.

As related art, an overview of two techniques below of exposure control processing will be described in the order of (1) Focal-plane shutter operation and occurrence of distortion, and (2) Exposure time control (shutter control) to set exposure times by different regions.

(1) Focal-Plane Shutter Operation and Occurrence of Distortion

First, focal-plane shutter operation and the occurrence of distortion will be described. A shutter operation that controls exposure starting and exposure ending from one direction of an imaging device face is a shutter operation method of image shooting processing with an imaging apparatus. This shutter operation is called a focal-plane shutter operation or a rolling shutter operation. A feature is that if exposure starting and exposure ending is controlled from an upper row of the imaging device towards a lower row, for example, exposure time between rows shifts slightly.

A CMOS image sensor configuration and shooting processing example will be described as an example of an imaging device having a focal-plane shutter operation function, with reference to FIG. 1. FIG. 1 is a diagram showing a partial configuration of an imaging device (CMOS image sensor) 101. The imaging device (CMOS image sensor) 101 is configured to have a vertical scanning circuit 102, horizontal scanning circuit 103, and multiple pixels 104 that have been disposed in an array.

Within the pixels 104, a charge is accumulated in a photodiode by an exposure processing that accompanies the shooting of a subject. The charge accumulated in the photodiode of each pixel is output to a vertical signal line 113 via an amplifying transistor and transfer transistor. The signal current output to the vertical signal line 113 is further supplied to the horizontal scanning circuit 103, and upon a predetermined signal processing having been executed, is output externally via a signal output line 114.

The pixels arrayed vertically are connected in common to the vertical signal line 113, so in order to independently read out the signals of each pixel, only the signal for one pixel should be output at one time to the vertical signal line 113. That is to say, with the imaging device (CMOS image sensor) 101, as shown in FIG. 2A, for example, a signal is first read out from each of the pixels 104d arrayed in the lowest row, and next, readout is performed from the row of pixels 104c as shown in FIG. 2B, and subsequently the readout rows are changed and signal readout is performed, thereby enabling independent readout of signals of each pixel. The control signals for the pixel readout are output from a horizontal reset line 111 and horizontal selection line 112 connected to the vertical scanning circuit 102 shown in FIG. 1, for example.

The pixels 104 making up the imaging device (CMOS image sensor) each start exposure again, immediately following the readout processing of the accumulated charge. That is to say, exposure processing for the next image frame is started.

Thus, upon the readout processing being executed sequentially by row, and immediately thereafter exposure processing being started, differences in the starting point-of-time and ending point-of-time of exposure, i.e., a shift in exposure time (or exposure period) occurs between the photodiode 104a of the head row and the photodiode 104d of the last row. This is a feature of a shutter operation called a focal-plane shutter operation or rolling shutter operation.

Note that the diagram only shows the four rows of 104a through 104d, but this only shows a portion of the imaging device, and an actual imaging device has a great number of rows set, such as several hundred to several thousand rows, and sequential readout is executed by each row.

An example of starting and ending timings of exposure of each row and the charge readout starting timing will be described with reference to FIGS. 3 and 4. FIGS. 3 and 4 both show the temporal axis on the horizontal axis and the row on the vertical axis.

For example in FIG. 3, the charge readout timing has a timing shift occurring by row, as shown with the dotted line 151a, 151b shown in the diagram. Multiple rectangular blocks shown in FIG. 3 show the exposure time of a certain shot image frame, and are the exposure times by row block made up of a row or multiple rows.

Exposure processing is started immediately following the timing shown in the readout line 151a of the first shot image frame. As shown in the readout line 151a, the exposure start time becomes time that is slightly shifted for each row. In the graph shown in the diagram, the row on the upper side first has exposure started, and the lower the rows are, the later the exposure starts. The uppermost row has an exposure starting time of time (t1), and the bottommost row has an exposure starting time of time (t2).

The right edges of the multiple rectangular blocks shown in FIG. 3 are the timings of the readout processing of the exposure image to be executed, and accumulated charge of the pixels for the rows is read at the timings shown by the readout line 151b.

In this example, the exposure ending time is approximately the readout processing time, and as shown by the readout line 151b in FIG. 3, readout processing for each pixel is performed by row, sequentially from the head row. On the uppermost row, time (t2) is the exposure ending time, and on the bottommost row, time (t3) is the exposure ending time. Note that with this example, the exposure starting and exposure ending for each row has the same timing shift for each row, so the exposure time for all of the rows is the same.

FIG. 4 shows the exposure processing and readout timing corresponding to two continuously shot frame images at the time of motion shooting. As shown in FIG. 4, the period of the readout line 152a through readout line 152b is the exposure time for the head shooting frame N, and the pixel value readout is executed from each row at the timing shown by readout line 152b.

The period of the readout line 152b through readout line 152c is the exposure time for a trailing shot frame N+1, pixel value readout is executed for each row at the timing shown by readout line 152c.

In the example shown in FIG. 4, for the head shot frame N, the exposure starting time is time (t1a) for the uppermost row and time (t1b) for the bottommost row, and the exposure ending time is time (t1b) for the uppermost row and time (t1c) for the bottommost row. For the trailing shot frame N+1, the exposure starting time is time (t2a) for the uppermost row and time (t2b) for the bottommost row, and the exposure ending time is time (t2b) for the uppermost row and time (t2c) for the bottommost row.

In the example shown in FIG. 4, for example the exposure time of the bottommost row of the head shot frame N and the exposure time of the uppermost row of the trailing shot frame N+1 are roughly in the same timeframe. That is to say, a phenomenon occurs wherein the image data on the lower side of the head image frame and the image data on the upper side of the trailing frame are images in roughly the same timeframe.

As a result, for example, in the case of imaging a subject having movement, or in the case of performing shooting processing such as moving the camera itself during exposure and shooting, distortion occurs in the image from shifts in the exposure time between rows resulting from the focal-plane shutter operations.

An example of image distortion will be described with reference to FIGS. 5A through 5D. FIG. 5A is a photograph example in the case of shooting with the camera in a stopped state. FIG. 5B is a photograph example in the case of shooting while moving the camera in a horizontal direction. The image in FIG. 5A has no distortion occurring, but the image shown in FIG. 5B has distortion occurring.

Similarly, FIG. 5C is a photograph example in the case of shooting while a car is in a stopped state. FIG. 5D is a photograph example in the case of shooting while a car is in a moving state. The image in FIG. 5C has no distortion occurring, but the image shown in FIG. 5D has distortion occurring.

Such distortion occurs due to shifts in exposure time of the imaging devices described with reference to FIGS. 3 and 4, i.e., due to exposure time differing a little at a time from the upper edge row to the lower edge row. The distortion occurrence phenomenon is called a focal-plane shutter phenomenon or a rolling shutter phenomenon.

Related art for reducing such distortion by a focal-plane operation will be described. For example, Japanese Unexamined Patent Application Publication No. 2004-140479 discloses a method of reducing distortion of a subject having movement, in which reset operations and readout operations by imaging devices are performed at high speed, the image data read out at high speed is temporarily stored in a storage device, and the stored data is read out at a slower frame rate and output downstream.

The method described in Japanese Unexamined Patent Application Publication No. 2004-140479 has to have high speed readout operations performing in order to reduce distortion. However, high speed operations are restricted, so completely eliminating distortion is impractical. Further, a secondary problem occurs, which is that power consumption increase and noise increase occurs due to the high speed operations.

Also, Japanese Unexamined Patent Application Publication No. 2004-140149 discloses a technique for adding transistors used for global shutter operations, inside pixels. However, the disclosed technique in Japanese Unexamined Patent Application Publication No. 2004-140149 has to have a transistor added so the pixel size of the imaging device increases, and is restricted by not being applicable to use in a small image sensor or a mega-pixel image sensor.

Also, Japanese Unexamined Patent Application Publication No. 2006-148496 discloses a configuration to reduce distortion by taking in an output signal from an image sensor to a storage apparatus, and generating one image from multiple frames.

The method in Japanese Unexamined Patent Application Publication No. 2006-148496 will be described using FIG. 6. FIG. 6 shows exposure time by row for three consecutive shot frames at the time of motion shooting, the three frames being frame N−1, frame N, and frame N+1. As shown in FIG. 6, with an imaging device (CMOS image sensor), shooting is executed with a focal-plane shutter operation, and exposure timing differs by row. Accordingly, distortion such as that described earlier with reference to FIGS. 5A through 5D, i.e. image distortion resulting from movement of the object or the camera itself occurs. Thus, the images shot at before and after times are used, interpolation is performed which takes time into consideration, and an image is generated and output which is equivalent to that wherein an image of all of the rows of one image frame has been shot at the same time at a certain time.

For example, in the case that the three images of frames N−1 through N+1 are shot with the settings in FIG. 6, correction of the image in frame N is performed, and a corrected image similar to that shot at the same time as a timing TO, which is in the center position of the shooting time, is generated. In this event, correction processing is performed with reference to the image in frame N−1 and the image in frame N+1.

The technique described in Japanese Unexamined Patent Application Publication No. 2006-148496 has the advantage that computation is simple, since an image is generated by linear interpolation between frames. However, a storage apparatus (memory) serving as a frame buffer has to be provided. Also, the processing is not to eliminate distortion, but to cause the distortion to be unnoticeable by blurring the distortion, so there is a problem in that the screen blurs greatly if an object or the camera moves greatly.

For example, in this case of an image shot with the settings in FIG. 6, in the generating processing for the corrected image of the frame N, the row on the upper edge of the image is created by interpolation using weighting of approximately the same amount for each of the image of the frame N and the image of the frame N+1, and the row on the lower edge of the image is also created by interpolation using weighting of approximately the same amount for each of the image of the frame N and the image of the frame N+1. By performing such processing, the amount of blurring due to movement of objects increases at the upper edge and lower edge of the screen. However, the center portion of the screen is approximately interpolated by the image in frame N, so the center of the screen only blurs as before, so there is a problem in that the amount of blurring greatly differs depending on the position on the screen.

Also, Japanese Patent Application No. 2007-208580 discloses a configuration to reduce distortion wherein the output signal of the imaging device is temporarily taken into a memory, motion vectors are detected for each divided region of multiple consecutive photograph images stored in the memory, and one corrected image is generated while performing position correction.

With the method in Japanese Patent Application No. 2007-208580, blurring does not occur from correction processing as with the above-described Japanese Unexamined Patent Application Publication No. 2006-148496, but there are problems in that computation of detecting the motion vectors is complicated, and in the case that computing the motion vector fails, visually perceivable image breakdown occurs.

Further, Japanese Unexamined Patent Application Publication No. 2007-336314 discloses a configuration to reduce distortion with focal-plane operations, wherein a great number of images taken consecutively are taken in to the memory by high speed operations of the imaging device, for example, and one corrected image is generated from these images.

The method in Japanese Unexamined Patent Application Publication No. 2007-336314 is a configuration to generate an image with linear interpolation, similar to the method in Japanese Unexamined Patent Application Publication No. 2006-148496, but has the advantage in that the amount of blurring in the entire screen due to high speed operation of the imaging device is negligible, and distortion can be corrected well.

However, with the method in Japanese Unexamined Patent Application Publication No. 2007-336314, high speed operation of the imaging device is a premise, so similar to the configuration in the above-described Japanese Unexamined Patent Application Publication No. 2004-140479, power consumption increase and noise increase become problems.

(2) Exposure Time Control (Shutter Control) to Set Exposure Times by Different Regions Next, exposure time control (shutter control) to set exposure times by different regions will be described. The exposure time as to each pixel of the imaging device can be controlled to expand a dynamic range of the shot image.

In a bright subject region, when the exposure time is long, the accumulated charge of the pixel saturates, and an accurate pixel value is not obtained. On the other hand, in a dark subject region, a longer exposure time enables a more accurate pixel value to be obtained, corresponding to the subject brightness. Thus, in a region where the subject is bright, a pixel value of a pixel set for a short exposure time is obtained as a valid pixel value. On the other hand, in a region where the subject is dark, the pixel value of the pixel having a long exposure time is obtained as a valid pixel value. These are combined to generate an output image. Note that at the time of output of a final pixel value, pixel value adjustment processing based on the exposure times is executed.

Japanese Unexamined Patent Application Publication Nos. 2006-253876 and 2006-542337, and Japanese Patent Application No. 2008-147818 disclose techniques to expand the dynamic range of a shot image, setting the exposure times that differ by region of the imaging device. For example, the configuration sets a short time exposure row and a long time exposure row in every other row of the pixel rows of the imaging device.

For example, Japanese Unexamined Patent Application Publication No. 2006-253876 discloses a configuration wherein electronic shutter operations of a CMOS image sensor are operated with the even-numbered rows and odd-numbered rows operating alternately, thereby setting high-sensitivity pixels (long time exposure pixels) and low sensitivity pixels (short time exposure pixels), and enabling imaging of a high dynamic range image by combining pixel values according to the subject brightness.

Japanese Patent Application No. 2008-147818 discloses a configuration wherein, in addition to the configuration in Japanese Unexamined Patent Application Publication No. 2006-253876, modification by row is also further enabled for readout timing.

Japanese Unexamined Patent Application Publication No. 2006-542337 discloses a configuration wherein, in an imaging device having a color filter with a Bayer array, two patterns of exposure time are set for each row, or for multiple rows of more than one, and changes are made with electronic shutter operations.

The configurations in Japanese Unexamined Patent Application Publication Nos. 2006-253876 and 2006-542337, and Japanese Patent Application No. 2008-147818 execute exposure time control by region, with a configuration using an electronic shutter.

(3) Overview of Related Art

As described above, with a configuration using a focal-plane shutter, shifting in exposure periods by row occurs, for example, and the fundamental problem of distortion occurring that results from this shifting is not resolved. Also, techniques to perform exposure period control by region and expand the dynamic range are used, but with these configurations also, the shifting of exposure period by row is not prevented in the case that a focal-plane shutter is used, and the problem where distortion resulting from this shifting occurs is not resolved.

SUMMARY

As described above, with an imaging device that performs focal-plane operations, distortion of a shot image occurs when shooting a subject that is moving and the like. It has been found desirable to provide an image processing device and image processing method and program that enables suppression of distortion of a shot image with an imaging apparatus that performs focal-plane operations.

According to an embodiment of the present disclosure, an image processing apparatus includes an intermediate image generating unit configured to input an image which has been shot with differing exposure times set by region, generate multiple exposure pattern images corresponding to differing exposure times based on the input image, and generate multiple timing images which are difference images of the plurality of exposure pattern images; and a distortion correction processing unit configured to generate a corrected image equivalent to an exposure processing image at a predetermined exposure time by synthesizing processing of the plurality of timing images.

The intermediate image generating unit may be configured to input an image having exposure time shifting in increments of regions shot with a focal-plane shutter operation, generate multiple exposure pattern images corresponding to different exposure times based on the input image, and generate multiple timing images which are difference images of the plurality of exposure pattern images.

The intermediate image generating unit may generate multiple timing images having exposure times shorter than that of the input image, wherein the distortion correction processing unit synthesizes multiple timing images having exposure times that are shorter than that of the input image and generates the corrected image.

The distortion correction processing unit may select a timing image having an exposure time that is included in the exposure times of the corrected image that is to be generated, and executes synthesizing processing applying the selected timing image.

For a timing image having all of the exposure times in the exposure times of the corrected image to be generated, at the time of computing pixel values of the corrected image, the distortion correction processing unit may perform processing to reflect the pixel values of the timing image in all of the pixel values of the corrected image; and for a timing image having an exposure time overlapping portion with a portion of the exposure times of the corrected image to be generated, the distortion correction processing unit performs processing to reflect the pixel values of the timing image in the pixel values of the corrected image according to the ratio of overlapping portions.

The timing image generated by the intermediate image generating unit may be an image that has been set with exposure times that differ in pixel row increments; and the distortion correction processing unit selects a timing image having the exposure times included in the exposure times of the corrected image to be generated in pixel row increments, and executes synthesizing processing applying the selected timing image.

The intermediate image generating unit may generate the timing image as continuously shot images with an exposure time shorter than that of the input image the intermediate image generating unit further including an output unit configured to output this timing image generated by the intermediate image generating unit as a high frame rate image.

The intermediate image generating unit may further include multiple intermediate image generating units that execute processing in parallel as to multiple continuously shot images; wherein the distortion correcting unit generates a corrected image equivalent to the exposure processing image having predetermined exposure times, with the synthesizing processing of the plurality of timing images generated by the plurality of intermediate image generating units.

A region, which is a control increment of exposure time of the input image, may be one of a pixel block made up of multiple pixels, or a row, or a pixel.

The image processing apparatus may further include a motion detecting unit configured to execute motion detection in region increments of the input image, wherein the output of the distortion correction processing unit is applied only for the region having motion detected, and an output image is generated.

The image processing apparatus may further include an imaging device; and a control unit configured to execute exposure time control in region increments of the imaging device.

According to another embodiment of the present disclosure, an image processing method executed by an image processing apparatus, includes: performing, by an intermediate image generating unit, inputting of an image which has been shot with differing exposure times set by region, generating of a plurality of exposure pattern images corresponding to differing exposure time based on the input image, and generating of a plurality of timing images which are difference images of the multiple exposure pattern images; and generating, by a distortion correction processing unit, a corrected image equivalent to an exposure processing image at a predetermined exposure time by synthesizing processing of the multiple timing images.

According to another embodiment of the present disclosure, A program to execute image processing with an image processing apparatus includes: causing an intermediate image generating unit to input an image which has been shot with differing exposure times set by region, generate a plurality of exposure pattern images corresponding to differing exposure time based on the input image, and generate a plurality of timing images which are difference images of the multiple exposure pattern images; and causing a distortion correction processing unit to generate a corrected image equivalent to an exposure processing image at a predetermined exposure time by synthesizing processing of the multiple timing images.

Note that the program according to the present disclosure is a program provided by a storage medium, for example, as to an information processing apparatus or computer system that can execute various program codes. Processing according to the program can be realized by executing such a program with a program executing unit on an information processing apparatus or computer system.

Further objects, features, and advantages of the present disclosure will become clear by the detailed description in the later-described embodiments and the appended drawings. Note that a system according to the present Specification is a theoretical collective configuration of multiple apparatuses, and is not restricted to apparatuses with various configurations within the same housing.

According to the above-described configurations, an image can be obtained in which distortion, resulting from focal-plane operations or the like which occurs based on subject movement and so forth, has been suppressed. Specifically, provided is an image processing apparatus including an intermediate image generating unit configured to input an image having exposure time shifting in region increments which has been shot with a focal-plane shutter operation, for example, generates multiple exposure pattern images corresponding to differing exposure times based on the input image, and generates multiple timing images which are difference images of the multiple exposure pattern images, and a distortion correction processing unit configured to generate a corrected image equivalent to an exposure processing image at a predetermined exposure time with synthesizing processing of multiple timing images generated by the intermediate image generating unit. For example, images without distortion can be generated by selecting only the timing images having a predetermined exposure time, and synthesizing these, in increments of rows for example.

BRIEF DESCRIPTION OF THE DRAWINGS

FIG. 1 is a diagram describing a configuration of an imaging device and imaging processing;

FIGS. 2A and 2B are diagrams describing a configuration of an imaging device and imaging processing;

FIG. 3 is a diagram describing an imaging processing sequence by a focal-plane operation;

FIG. 4 is a diagram describing an imaging processing sequence by a focal-plane operation;

FIG. 6 is a diagram describing a configuration that reduces distortion by generating one image from multiple frames;

FIG. 7 is a diagram describing a configuration example of an imaging apparatus serving as an image processing apparatus;

FIG. 11 is a diagram describing a specific example of processing executed by the intermediate image generating unit;

FIG. 13 is a diagram describing a specific example of processing executed by distortion correction processing unit;

FIGS. 14A through 14C are diagrams describing an example of an exposure control pattern;

FIG. 15 is a diagram describing an example of an exposure control pattern;

FIG. 20 is a diagram describing a configuration example of a distortion correcting unit;

FIG. 21 is a diagram describing a distortion correction processing example that is executed with the configuration of the distortion correcting unit shown in FIG. 20;

FIG. 22 is a diagram describing output processing of a high speed frame rate image that is executed by a distortion correcting unit that has no frame buffer;

FIG. 23 is a diagram describing a configuration example of a distortion correcting unit;

FIGS. 25A through 25C are diagrams describing an image example applicable to correction processing of focal-plane distortion according to the related art;

FIG. 26 is a diagram describing a correction processing example of focal-plane distortion according to the related art;

FIG. 29 is a diagram illustrating examples of exposure control patterns.

DETAILED DESCRIPTION OF EMBODIMENTS

Figure 5A:
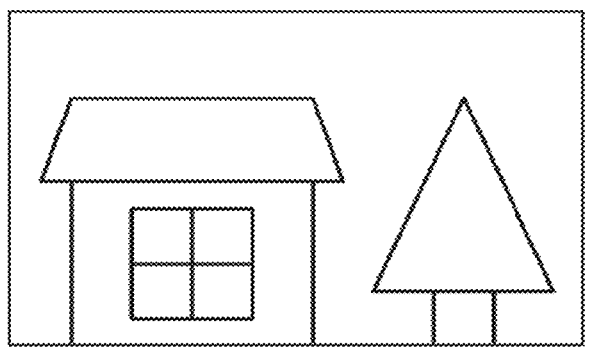
FIGS. 5A through 5D are diagrams describing an image distortion occurrence example as a problem with an imaging processing by a focal-plane operation.
Figure 5B:
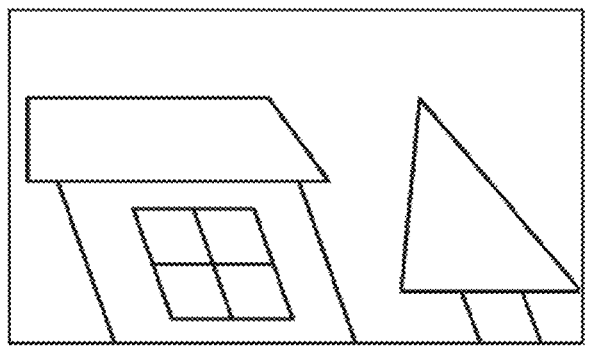
Figure 5C:
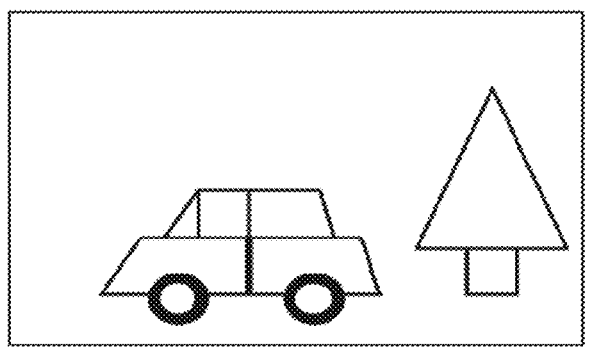
Figure 5D:
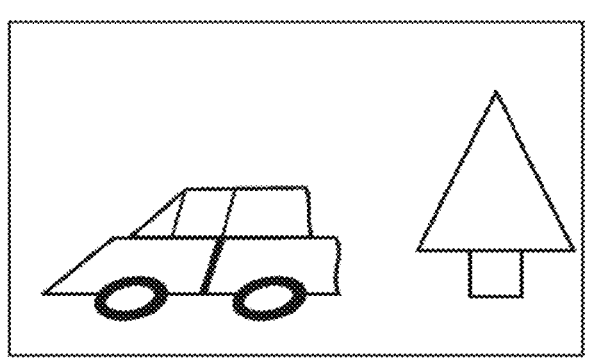

Details of the image processing apparatus and image processing method and program according to the present disclosure will be described below with reference to the diagrams. Description will be given in the following order.

1. Configuration Example of Image Processing Apparatus
2. Details of Configuration and Processing of Distortion Correcting Unit
   2-1. Overall Configuration and Processing of Distortion Correcting Unit
   2-2. Processing of Intermediate Image Generating Unit
   2-3. Processing of Distortion Correction Processing Unit
3. Other Embodiments
   3-1. Modification of Exposure Control Pattern
   3-2. Modification of Exposure Time Control
   3-3. Modification of Frame Buffer Setting
   3-4. Modification of Distortion Correcting Processing
4. Shared Configuration Example with Other Image Processing
5. Description of Advantages of Processing of the Present Disclosure 3. Configuration Example of Image Processing Apparatus First, a configuration example of the imaging apparatus serving as an embodiment of an image processing apparatus will be described with reference to FIG. 7. As shown in FIG. 7, the imaging apparatus has an optical lens 201, imaging device 202 that configured to have a CMOS image sensor or the like, distortion correcting unit 203 that corrects image distortion resulting primarily from focal-plane operations, signal processing unit 205, and control unit 207.

The incident light enters the imaging device (CMOS image sensor) 203 via the optical lens 201. The imaging device 202 is an imaging device wherein sequential readout processing by region, e.g. by row, according to a focal-plane operation, is executed.

The imaging device 202 accumulates a charge with the pixels of the imaging device according to the incident light, and outputs a photoelectric conversion signal based on the accumulated charge to the distortion correcting unit 203 as image data.

The distortion correcting unit 203 inputs the output image signal from the imaging device 202, and corrects the image distortion resulting from a focal-plane operation. This processing will be described in detail later. The distortion correcting unit 203 outputs the corrected image 204 generated by distortion correction to the signal processing unit 205.

At the signal processing unit 205, corrected image 204 that has been subjected to distortion correction is input, and predetermined image processing such as white balance adjusting processing, gamma correction processing and the like, for example, are performed on the input image, and an output image 206 is generated and output.

The imaging apparatus is an imaging apparatus that can photograph moving or still images, and the image device (CMOS image sensor) 202 has a similar configuration as that described above with reference to FIG. 1. Note that the image device (CMOS image sensor) 202 is an imaging device that can control exposure time by region with the control of the control unit 207.

For example, exposure time control by image region is executed with a certain configuration described in Japanese Unexamined Patent Application Publication Nos. 2006-253876 and 2006-542337, and Japanese Patent Application No. 2008-147818 described above, or another configuration according to the related art.

Note that with the examples described below, as an example of the imaging device 202, an example using an imaging device having the configuration shown in FIGS. 8A and 8B will be described.

Figure 8A:
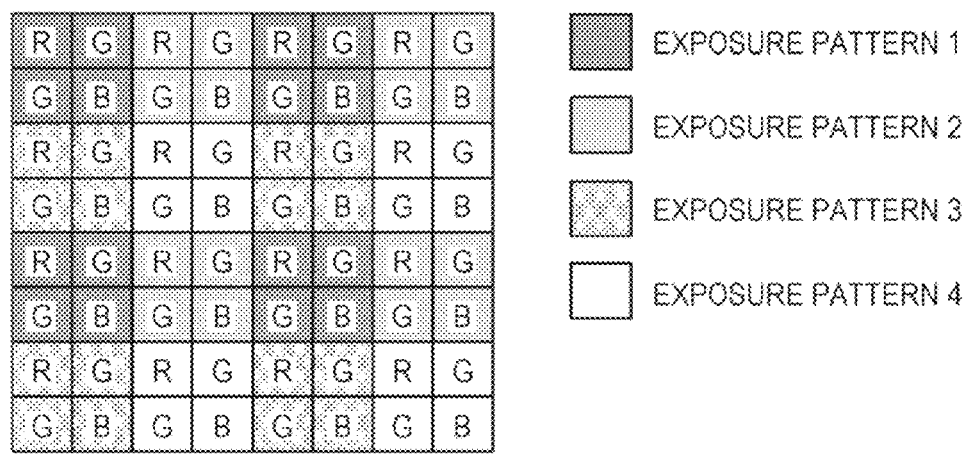
FIGS. 8A and 8B are diagrams describing a setting example of an exposure pattern.
Figure 8B:
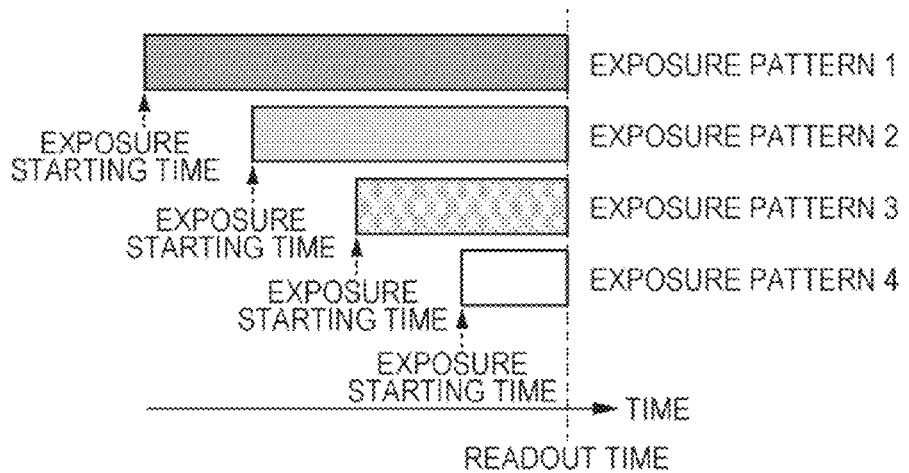

The imaging device 202 has an RGB array as shown in FIG. 8A, and the exposure time (exposure patterns 1 through 4) that differs by units of four pixels is set, as shown in FIGS. 8A and 8B, as (a) Pixel block with the longest exposure time (Exposure Pattern 1)
(b) Pixel block with the second longest exposure time (Exposure Pattern 2)
(c) Pixel block with the third longest exposure time (Exposure Pattern 3), and
(d) Pixel block with the shortest exposure time (Exposure Pattern 4).

Pixel blocks with such four patterns of exposure times are set so as to be adjacent, as shown in FIG. 8A, and are cyclically arrayed. The exposure time ratio of the exposure patterns 1 through 4 is 4:3:2:1, and as shown in FIG. 8B, the exposure starting time differs by pattern, and readout times are equal.

Figure 9:
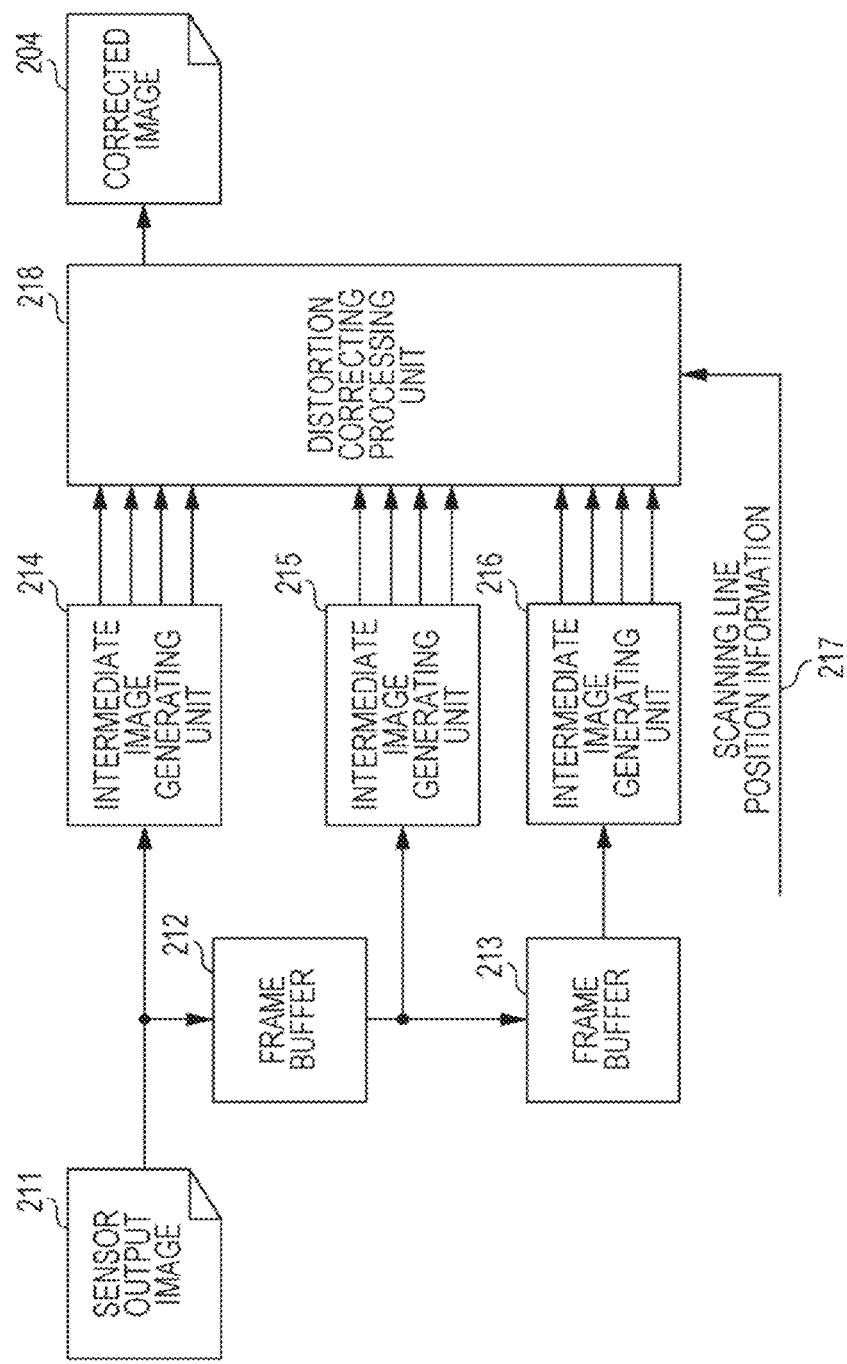
FIG. 9 is a diagram describing a configuration of a distortion correcting unit and a processing example.

2. Details of Configuration and Processing of Distortion Correcting Unit 2-1. Overall Configuration and Processing of Distortion Correcting Unit Next, the configuration and processing of the distortion correcting unit 203 will be described with reference to FIG. 9. As shown in FIG. 9, a sensor output image 211 which is an output image from the imaging device 202 is input into the distortion correcting unit 203. This sensor output image 211 is stored sequentially in the frame buffers 212 and 213. For example, when shooting a moving picture, the continuously shot frames are sequentially stored in the frame buffers 212 and 213.

Note that processing can be performed to output one image, using a continuously shot image at time of still image photography also, and can be applied to the time of shooting of either still images or moving pictures. If we say that three continuously shot images are frames N−1, N, N+1, and the sensor output image 211 which is the newest shot image is frame N+1, then the frame images are stored, frame N in the frame buffer 212, and frame N−1 in the frame buffer 213.

The intermediate image generating units 214 through 216 each generate multiple intermediate images as to the sensor output image 211 and the stored images in the frame buffers 212 and 213. This intermediate image generating processing will be described later.

The multiple intermediate images generated by the intermediate image generating units 214 through 216 are input in the distortion correction processing unit 218. The distortion correction processing unit 218 inputs the multiple intermediate images generated by the intermediate image generating units 214 through 216, and further a scanning line position information 217 to be input from the control unit 207 is further input, the image distortion from a focal-plane shutter is corrected, and the corrected output image 219 is generated. This processing will be described later.

2-2. Processing of Intermediate Image Generating Unit

Next, processing of the intermediate image generating unit configured within the distortion correcting unit 203 shown in FIG. 9 will be described with reference to FIG. 10. The distortion correcting unit 203 has three intermediate image generating units 214 through 216, as described with reference to FIG. 9.

The intermediate image generating units 214 through 216 perform processing as to images that have each been consecutively shot. Specifically, the intermediate image generating unit 214 executes processing as to the sensor output image (frame N+1), the intermediate image generating unit 215 executes processing as to the stored image (frame N) in the frame buffer 212, and the intermediate image generating unit 216 executes the stored image (frame N−1) in the frame buffer 213.

The processing to execute these three intermediate image generating units 214 through 216 differs only in the images to be processed, and basically are the same processing. Accordingly, the processing of the intermediate image generating unit 214 will be described below as a representative example.

A sensor output image 211 is input into the intermediate image generating unit 214. The sensor output image 211 is an image having been shot, with exposure patterns (exposure patterns 1 through 4) that differ by pixel region, i.e., by setting four types of different exposure times, as described above with reference to FIGS. 8A and 8B.

Figure 10:
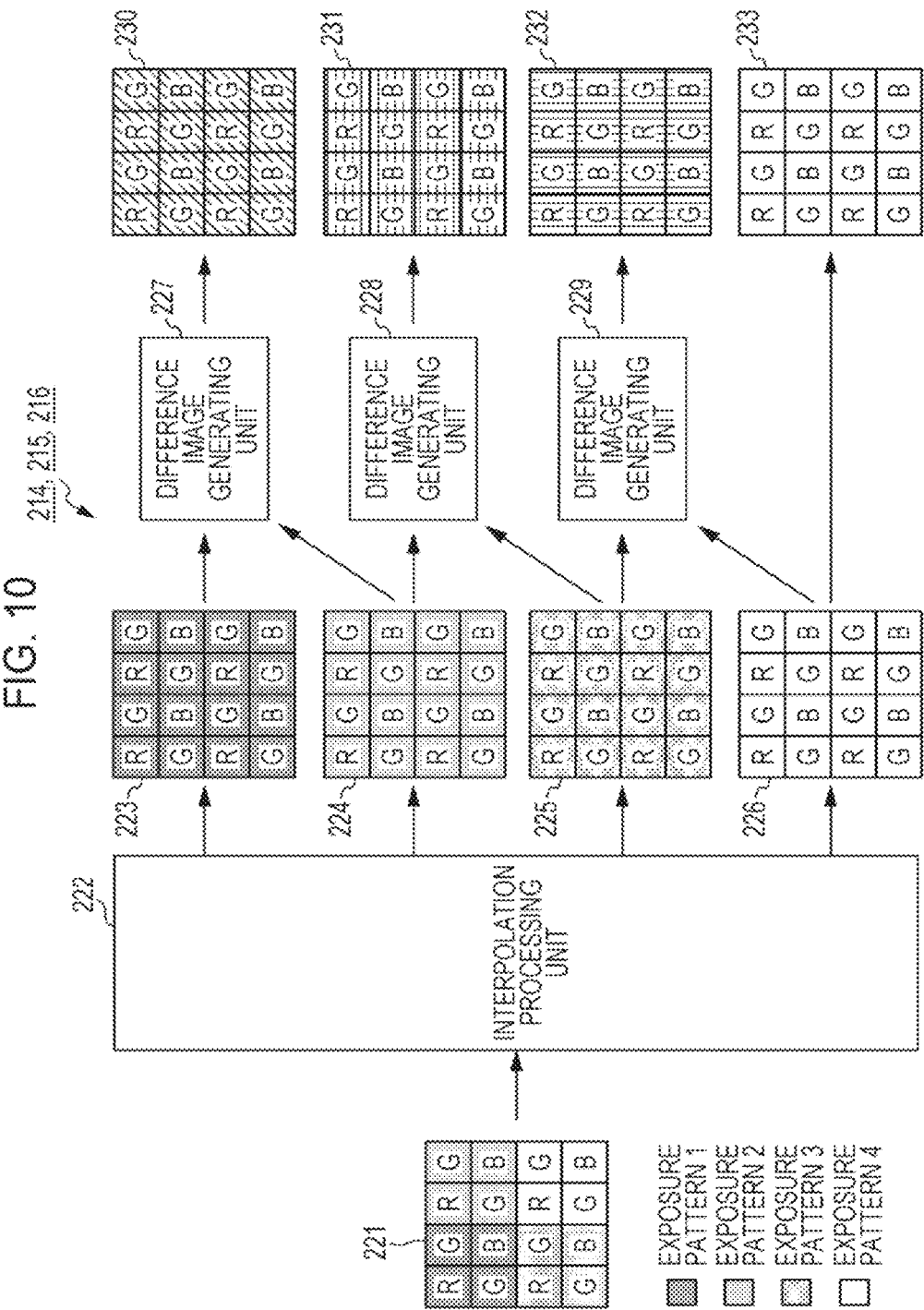
FIG. 10 is a diagram describing a configuration of an intermediate image generating unit and a processing example.

First, the interpolating processing unit 222 shown in FIG. 10 inputs the sensor output image 221 that has been set with four exposure times. The sensor output image 221 shown in FIG. 10 corresponds to the sensor output image 211 in FIG. 9. The interpolating processing unit 222 performs interpolation processing so that the exposure patterns are obtained for all of the pixels. That is to say, with each of the four exposure times for all of the pixels of the sensor output image 221, four exposure pattern images 223 through 226, which are equivalent to an image shot with exposure processing having been performed uniformly, are generated. Specifically, the four exposure pattern images below are generated:

(a) Exposure pattern image 223 that is equivalent to an image shot with exposure pattern 1 having the longest exposure time,
(b) Exposure pattern image 224 that is equivalent to an image shot with exposure pattern 2 having the second longest exposure time,
(c) Exposure pattern image 225 that is equivalent to an image shot with exposure pattern 3 having the third longest exposure time, and
(d) Exposure pattern image 226 that is equivalent to an image shot with exposure pattern 4 having the shortest exposure time; these four exposure pattern images are generated.

The interpolation processing executed in exposure pattern image generating by the interpolation processing unit 222 is an interpolation method by a filter such as linear interpolation or the like, or a method wherein edge direction detection is performed and interpolation is based thereupon, or the like. The four exposure pattern images 223 through 226 generated by the interpolation processing unit 222 are each input into three different image generating units 227 through 229, with a pair having the least difference in exposure time as one pair.

The processing of the difference image generating units 227 through 229 will be described with reference to FIG. 11. The exposure pattern images 223 through 226 that are equivalent to the images shot during the four different exposure times generated by the interpolation processing unit 222 shown in FIG. 10 are equivalent to the shot images during the four different exposure times (4T, 3T, 2T, 1T) as shown in FIG. 11.

The difference image generating units 227 through 229 each input a pair having little difference in exposure time from the four exposure pattern images and compute difference pixel values of corresponding pixels, and generate the images made up of the difference pixel values thereof as timing images 230 through 232.

The difference image generating unit 227 generates a first timing image 230 as below. The first timing image 230 is an image made up of the difference between a pixel value of the first exposure pattern image 223 which is equivalent to an image shot with the exposure pattern 1 which is the longest exposure time, and a pixel value of the second exposure pattern image 224 which is equivalent to an image shot with the exposure pattern 2 which is the second longest exposure time.

The difference image generating unit 228 generates a second timing image 231 as below. The second timing image 231 is an image made up of the difference between a pixel value of the second exposure pattern image 224 which is equivalent to an image shot with the exposure pattern 2 which is the second longest exposure time, and a pixel value of the third exposure pattern image 225 which is equivalent to an image shot with the exposure pattern 3 which is the third longest exposure time.

The difference image generating unit 229 generates a third timing image 232 as below. The third timing image 232 is an image made up of the difference between a pixel value of the third exposure pattern image 225 which is equivalent to an image shot with the exposure pattern 3 which is the third longest exposure time, and a pixel value of the fourth exposure pattern image 226 which is equivalent to an image shot with the exposure pattern 4 which is the shortest exposure time.

Also, the fourth timing image 233 uses the fourth exposure pattern image 226 without change, which is equivalent to the image shot with the exposure pattern 4 which is the shortest exposure time. The four difference images correspond to images shot with the settings of the exposure times as shown in FIG. 11. That is to say, (1) First timing image 230 is an image shot at exposure time T (t0 to t1),
(2) Second timing image 231 is an image shot at exposure time T (t1 to t2),
(3) Third timing image 232 is an image shot at exposure time T (t2 to t3), and
(4) Fourth timing image 233 is an image shot at exposure time T (t3 to t4).

Thus, the four timing images (different images) 230 through 233 are equivalent to the four consecutively shot images at the same exposure time (T), wherein the shooting timing has shifted by T each time.

Thus, each of the intermediate image generating units 214 through 216 shown in FIG. 9 generates four images shot at four different timings as to the input image. That is to say, the intermediate image generating unit 214 generates four timing images based on the sensor output image (frame N+1).

The intermediate image generating unit 215 generates four timing images based on the stored image (frame N) of the frame buffer 212. The intermediate image generating unit 216 generates four timing images based on the stored image (frame N−1) of the frame buffer 213.

2-3. Processing of Distortion Correction Processing Unit

Next, processing of the distortion correction processing unit 218 that is configured within the distortion correcting unit 203 shown in FIG. 9 will be described with reference to FIGS. 12A and 12B. The distortion correction processing unit 218 inputs a timing image generated by the intermediate image generating units 214 through 216, and corrects distortion caused by focal-plane shutter operations.

The distortion correction processing here is described with reference to FIGS. 12A and 12B. FIG. 12A is a diagram showing exposure time of three consecutively shot images. The vertical axis represents rows and the horizontal axis represents time. As described above with reference to FIG. 6, in the case of performing shooting processing with a focal-plane operation, the exposure time shifts sequentially by row of the imaging device. FIG. 12A shows a setting example of the exposure time by row of the images of frames N−1, N, and N+1, which are three consecutively shot images.

The images of frames N−1, N, and N+1 which are the three consecutively shot images correspond to images that are to be processed with the three intermediate image generating units 214 through 216 of the distortion correcting unit 203 shown in FIG. 9, i.e. correspond to the three images to be generated as timing images. That is to say, the intermediate image generating unit 214 generates four timing images based on the sensor output image (frame N+1).

The intermediate image generating unit 215 generates four timing images based on the storage image (frame N) of the frame buffer 212. The intermediate image generating unit 216 generates four timing images based on the storage image (frame N−1) of the frame buffer 213.

Figure 12B:
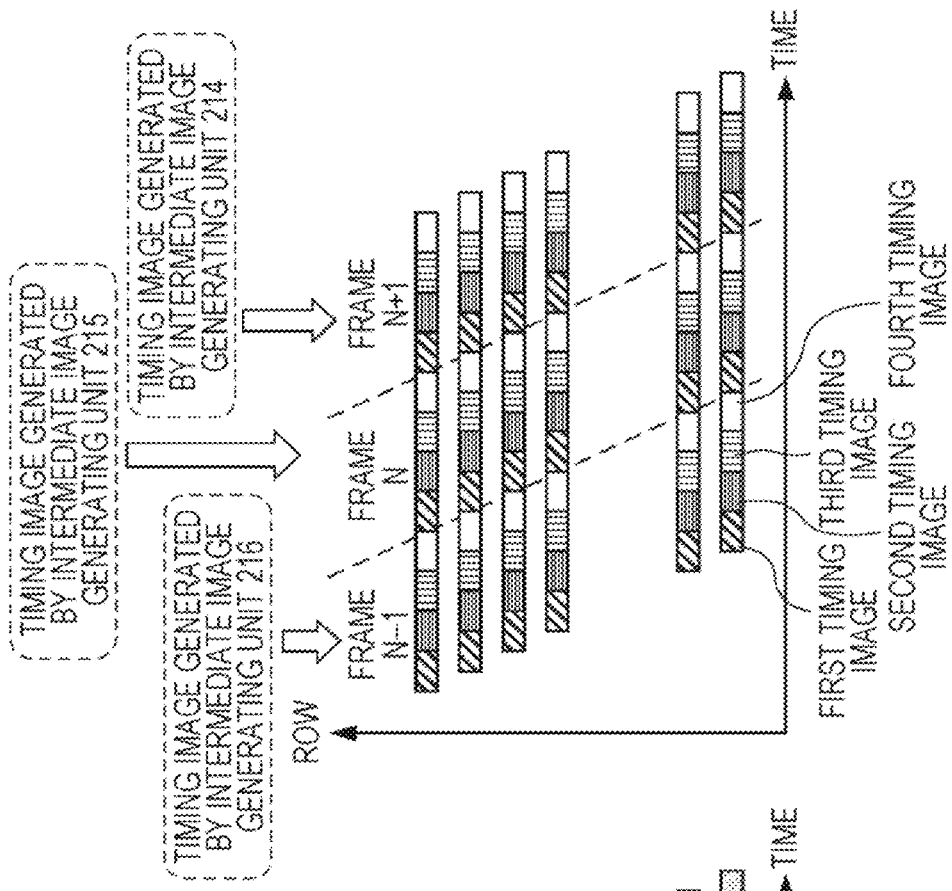
FIGS. 12A and 12B are diagrams describing a specific example of processing executed by distortion correction processing unit.

FIG. 12B is a diagram showing settings whereby the three intermediate image generating units 214 through 216 of the distortion correcting unit 203 can each distinguish four timing images generated based on the images of frames N+1 through N−1. As shown in FIG. 12B, the four timing images of frame N−1 are generated by the intermediate image generating unit 216 based on the stored image (frame N−1) of the frame buffer 213.

The four timing images of frame N are generated by the intermediate image generating unit 215 based on the stored image (frame N−1) of the frame buffer 212. The four timing images of frame N+1 are generated by the intermediate image generating unit 214 based on the sensor output image (frame N+1).

Figure 12A:
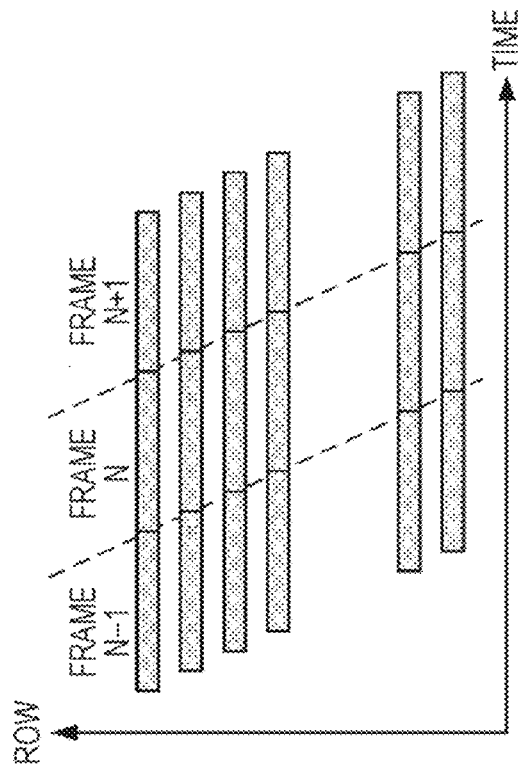

In FIG. 12A, three images (frame N−1 through frame N+1) are obtained by row, and in FIG. 12B, twelve (3×4=12) images (timing images) are obtained by row. The twelve images are equivalent to twelve images shot continuously which differ regarding exposure time (T). By generating the timing images in this way, data can be obtained with finer increments. With this fineness, reduction processing of distortion from a focal-plane shutter can be performed with higher precision that could be performed with the related art.

An example of processing executed with the distortion correction processing unit 218 will be described with reference to FIG. 13. FIG. 13 is a diagram that is similar to the diagram shown in FIG. 12B. The diagram shows settings whereby the three intermediate image generating units 214 through 216 of the distortion correcting unit 203 can each distinguish four timing images generated based on the images of frames N+1 through N−1.

For example, processing to generating an image with the output timing (Tx) shown in FIG. 13, i.e. a processing example in the case of generating an image shot wherein the exposure time is t1 through t2=Tx, will be described.

Processing to compute the pixel values of the pixels on the row of the upper edge making up the image at the output timing (Tx) shown in this FIG. 13 will be described. In the event of image generating processing, timing images A, B, C, D, E shown in FIG. 13 will be used. Of the shooting timing of timing images B, C, D, all periods are included in a range of output timing (Tx) of the image planned to be generated. Accordingly, these timing images B, C, D are used without change.

On the other hand, the shooting timing of timing images A and E is partially overlapping with the output timing (Tx)

of the image planned to be generated and partially not overlapping. Accordingly, blending processing is performed which multiplies these by a predetermined weighting coefficient.

The pixel values of the pixels on the row of the upper edge (OUT) making up the image at the output timing (Tx) shown in FIG. 13 are computed with the following (Expression 1)

$$OUT = a \times A + B + C + D + (1-a) \times E \quad \text{(Expression 1)}$$

where A through E are pixel values at the same pixel position as the various timing images, i.e. at the corresponding pixel position, and a is a weighting coefficient.

Note that the weighting coefficient a sets the value that is equivalent to the overlapping ratio of the output timing (Tx) shown in FIG. 13 and the various timing images, for example. Also note that the weighted coefficient a changes depending on the exposure timing of each row, so has to have a scanning line position information 217.

In the above (Expression 1), the timing images B, C, D use the pixel values 100% without blending and without change, and so the blurring by interpolation processing can be minimized.

As shown in FIG. 13, the timing images generated by the intermediate image generating unit 214 through 216 are images wherein the exposure time differing in increments of pixel rows is set, and the distortion correction processing unit 218 selects the timing image having the exposure time that is included in the exposure time of the corrected image planned to be generated in increments of pixel rows, and executes synthesizing processing to which the selected timing image is applied.

Pixel value computing processing for rows on the upper edge has been described above, but for example in the case of computing pixel values of an image at output timing (Tx) shown in FIG. 13 for rows on the lower edge, processing using timing images P, Q, R, S that are shown in FIG. 13 is performed.

The pixel value (OUT) of the pixel on the lower edge row can be found with (Expression 2) below $$OUT = P + Q + R + S \quad \text{(Expression 2)}$$

where P through S are pixel values at the same pixel position as the various timing images, i.e. the pixel values at corresponding pixel image positions.

In this case, the total of the exposure timings of the four timing images exactly matches the output timing (Tx), and the timing image overlapping with the output timing (Tx) does not have to be used. Other rows can also similarly have the pixel values of the output image computed with pixel value adding processing of multiple timing images using the pixel value (OUT) computing expression.

Thus, the distortion correction processing unit 218 synthesizes multiple timing images to compute the pixel values of the corrected images, and generates and outputs the corrected image 204.

As we can see from the processing described with reference to FIG. 13 herein, the distortion correction processing unit 218 generates the corrected image 204 with the synthesizing processing of multiple images (timing images). The exposure time of the timing image is an image having ¼ the exposure time of the original shot image, and the corrected image 204 is generated with synthesizing processing that combines these. That is to say, from the upper edge row to the lower edge row, a corrected image 204 using a timing image that is included in roughly the same exposure time (Tx) can be generated.

Consequently, the output image can be generated as an image shot with settings of roughly the same exposure time (Tx) for all of the rows from the upper edge row to the lower edge row.

Accordingly, the output image generated with the present method has very little occurrence of image distortion resulting from focal-plane operations such as described above with reference to FIGS. 5A through 5D. The image distortion resulting from focal-plane operations results from shifts in exposure time between the upper edge row and lower edge row, but by performing synthesizing processing of the timing image shown in FIG. 13, an image wherein all of the rows from the upper edge row to the lower edge row are shot with the settings of approximately the same exposure time (Tx) can be generated.

Consequently, the corrected image 204 generated by the distortion correcting unit 204 becomes an image that has suppressed image distortion.

As shown in FIG. 7, the corrected image 204 output by the distortion correcting unit 203 subsequently is output to the signal processing unit 205 and subjected to predetermined signal processing such as white balance adjustments and y correction and so forth, then output as an output image 206.

3. Other Embodiments

Next, other embodiments will be described.
3-1. Modification of Exposure Control Pattern
In the above-described examples, an example is described wherein setting is performed for four exposure times in increments of pixel blocks of a rectangular region, with reference to FIGS. 8A and 8B as exposure control patterns of an imaging device.

The setting patterns for exposure regions and exposure times are not restricted to such settings, and other various types of settings can be made. Regions to be control increments of exposure time of the input image may be set variously, such as pixel blocks made up of multiple pixels, or rows, or pixels.

Note that in the above-described example, the number of exposure control patterns is four, but the present disclosure can be implemented if there are two or more patterns. An example of changing two exposure patterns is shown in FIGS. 14A through 14C. FIG. 14A is an example of changing the electronic shutter operation every two rows and alternately setting two exposure times in increments of two rows. FIG. 14B is an example of changing the electronic shutter operation every two by two pixels and setting the two exposure times every two by two pixels. FIG. 14C is a method of driving by changing the electronic shutter operation in further different increments. The example shows settings whereby three pixels in the vertical direction and three pixels in the horizontal direction are alternately selected and a region is set, and the two exposure times of the regions are alternately set. Setting various exposure patterns in this manner can be performed.

Also, the pixel array described with reference to FIGS. 8A and 8B above and the pixel array shown in FIGS. 14A through 14C both have a pixel color filter in a Bayer array, but a pixel array that is for example a non-Bayer array of a pixel array as shown in FIG. 15 can also be applied.

Figure 16:
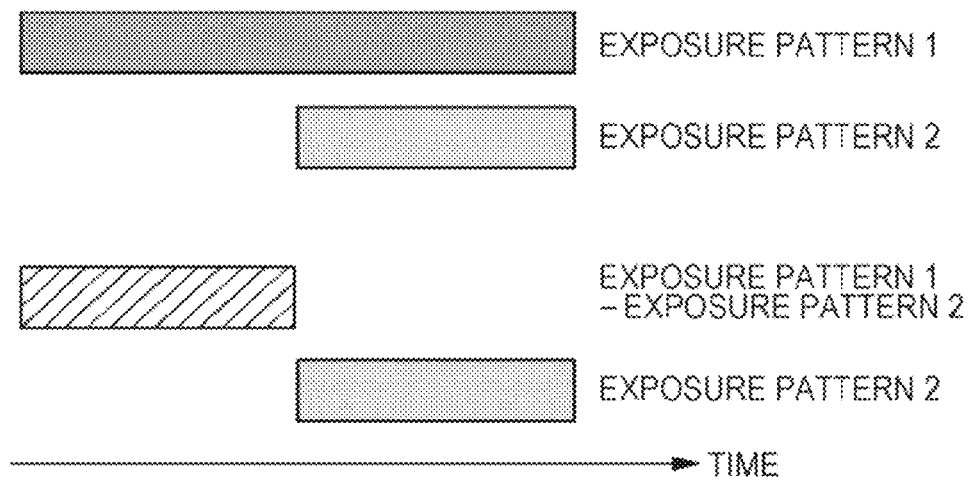
FIG. 16 is a diagram describing an exposure control pattern and a setting example of exposure time and a timing image.

The pixel array shown in FIG. 15 is a configuration wherein the pixel array has W (white) pixels in addition to RGB. Note that in the case there are two exposure patterns, for example as shown in FIG. 16, the exposure time ratio of the exposure time of exposure pattern 1 and exposure time of the exposure pattern 2 can be set as 2:1. The following holds true for the distortion correcting unit 203, as shown in FIG. 16.

(1) First timing image=exposure pattern 1−exposure pattern 2

(2) Second timing image=exposure pattern 2

These two timing images can be generated, and a corrected image that reduces the distortion by synthesizing processing of a timing image similar to the image generating processing described with reference to FIG. 13 above can be generated.

3-2. Modification of Exposure Time Control

With the above-described example, a setting example wherein exposure starting is shifted in region increments, and the readout timings are coordinated, has been described as shooting processing in the case of obtaining imaging images having different exposure times, but the exposure time control by region increments can have various settings.

Figure 17:
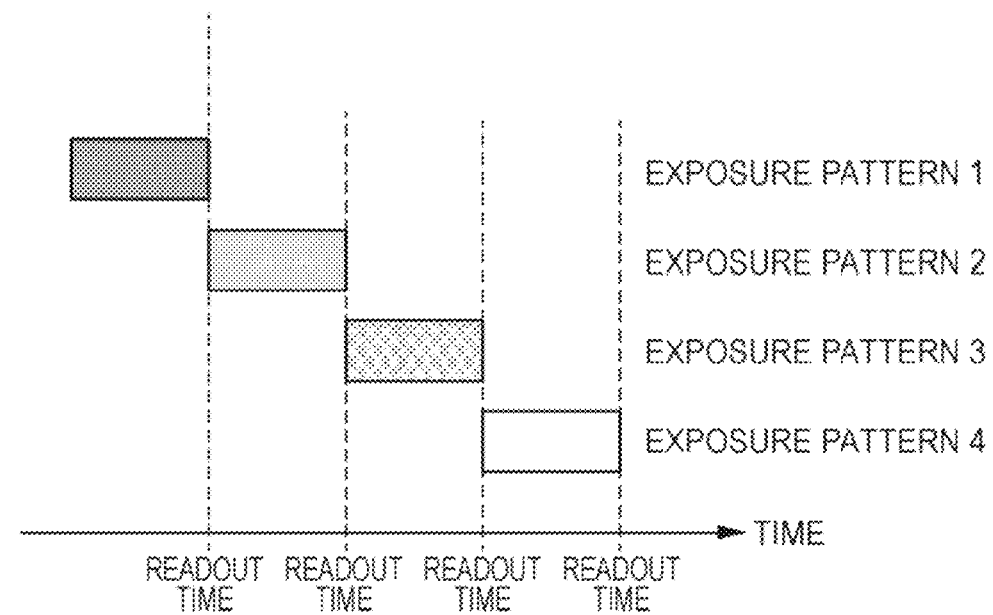
FIG. 17 is a diagram describing a processing example of exposure time control.

For example, as shown in FIG. 17, the readout timing can be shifted to obtain the image. Additionally, with the exposure time control in region increments as described in Japanese Unexamined Patent Application Publication Nos. 2006-253876 and 2006-542337, and Japanese Patent Application No. 2008-147818 described above, or with other controls, an image can be shot with settings to periodically perform control of exposure time or readout timing, by row or by pixel, and processing of images shot with such various controls can be performed.

3-3. Modification of Frame Buffer Setting

Figure 18:
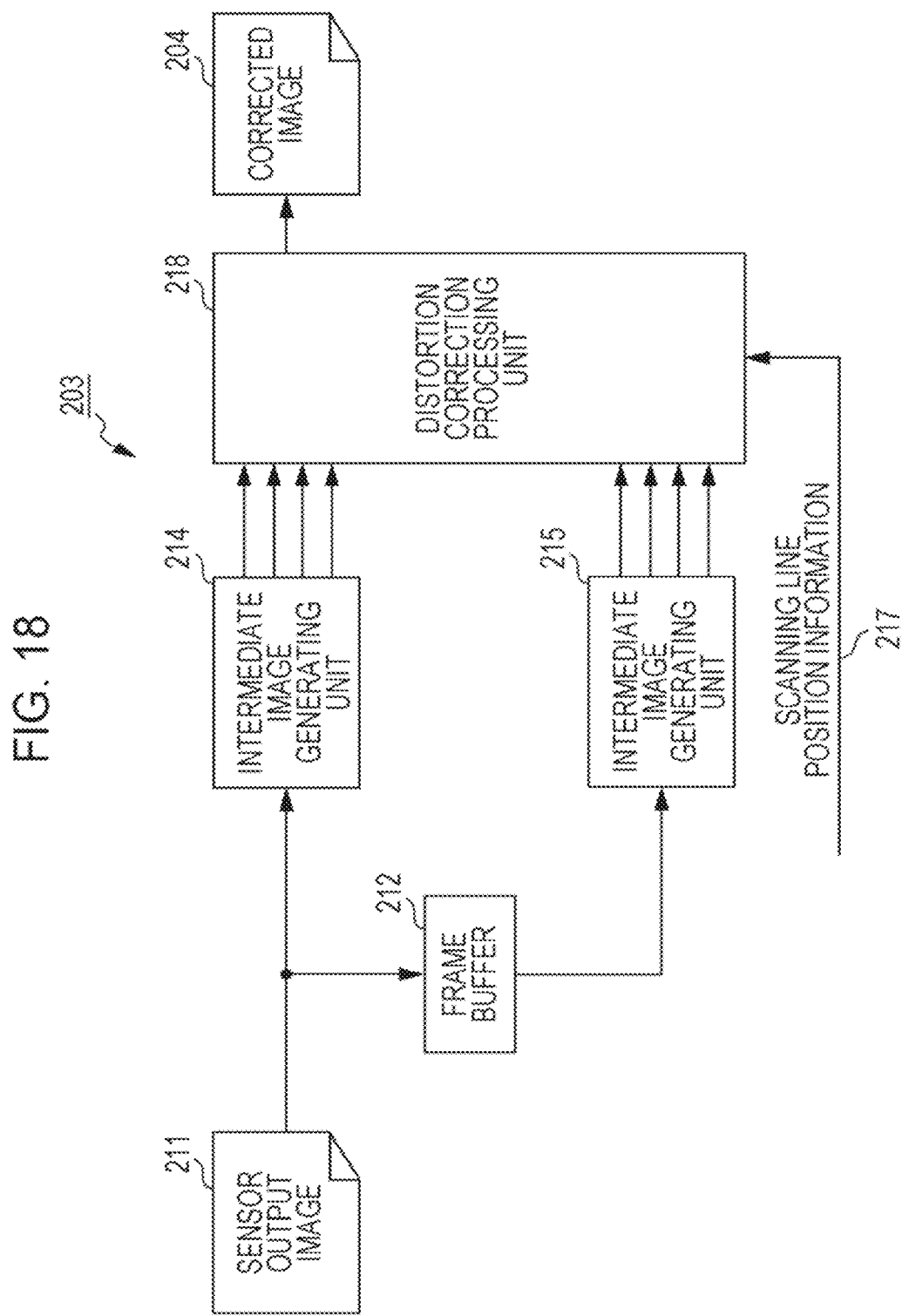
FIG. 18 is a diagram describing a configuration example of a distortion correcting unit.

With the configuration described above with reference to FIG. 9, an example using two frame buffers is shown, but a configuration may use one frame buffer as shown in FIG. 18, and may use only two consecutively shot images. With this configuration, storage apparatus capacity and reading/writing bands can be reduced.

Figure 19:
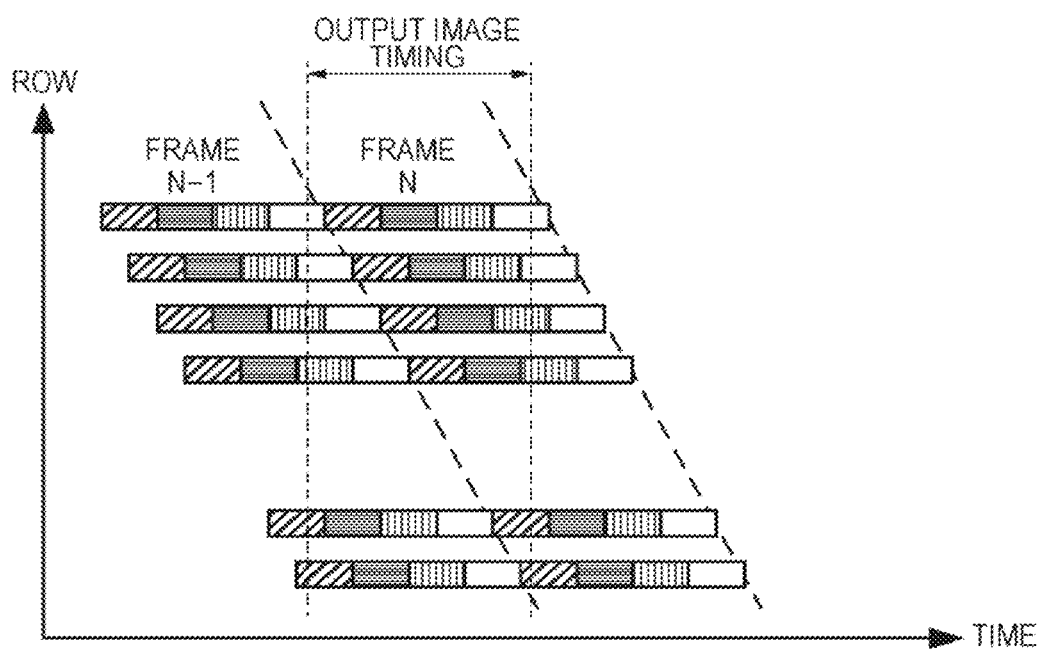
FIG. 19 is a diagram describing a distortion correction processing example that is executed with the configuration of the distortion correcting unit shown in FIG. 18.

Note that in the case of using this configuration, the distortion correction processing unit 218 generates a distortion corrected image using a timing image generated by applying only two consecutive frames as shown in FIG. 19, and not the processing applying the three frames of frame N−1 through frame N+1 as shown in FIG. 13.

Further, the present disclosure may have a configuration wherein a frame buffer is not used, as shown in FIG. 20. Note that in the case of using this configuration, the distortion correction processing unit 218 generates a distortion corrected image using multiple timing images generated by applying only one frame as shown in FIG. 21, and not the processing applying the three frames of frame N−1 through frame N+1 as shown in FIG. 13.

In this case, the setting of the exposure time period of an image output as shown in FIG. 21 results in a shorter time than the frame rate of the input image, whereby noise effects can occur. Also, as shown in FIG. 21, for example a timing image which includes exposure period of the data of the latter half portion of the output image timing for the upper edge row does not exist. Similarly, a timing image which includes exposure period of the data of the earlier half portion of the output timing for the lower edge row does not exist. Consequently, an image is generated just from a nearby timing image, whereby distortion reduction advantages by the focal-plane shutter operations can be thinned down slightly on the upper and lower edges. However, there is an advantage in that distortion can be corrected without using a frame buffer.

Further, the distortion correcting unit 203 can also generate an signal of a frame rate that is higher speed than the frame rate of the input image. That is to say, the intermediate image generating unit generates a timing image as a consecutively shot image having an exposure time that is shorter than the input image, and makes up an output unit whereby the timing image generated by the intermediate image generating unit is output as a high frame rate image, thereby enabling a frame rate signal that is higher speed than the frame rate of the input image to be generated and output.

Specifically, for example, as shown in FIG. 22, by generating an image with optional timing while performing correcting that eliminates focal-plane distortion as to the input image (frame N, N+1, . . . ), an image can be output that has a high frame rate of the output image (M, M+1, M+2, M+3, . . . ). Note that in the case of performing image output, performing predetermined image correcting such as brightness correcting and so forth and outputting is preferable.

3-4. Modification of Distortion Correction Processing

With the examples described above, an example using FIG. 13 and (Expression 1) have been described as correction processing performed with the distortion correcting unit 203, but applying a correction method using a method other than such a linear interpolation may be used.

For example, motion is detected from an image A and an image B which are two adjacent timing images shown in FIG. 13, and with motion compensation as to the image A, a motion compensation timing image A' that is premised on being shot at the same timing as image B is generated. Similarly, motion is detected from an image D and an image E, and a motion compensation timing image E' is generated.

These images are used to compute the pixel value (OUT) of the corrected image, according to (Expression 2) shown below.

$$\text{OUT} = a \times A' + B + C + D + (1-a) \times E' \qquad (2)$$

where A', B, C, D, E' are pixel values at the same pixel positions of the various timing images or motion compensation timing image, i.e. of corresponding pixel positions, and a is a weighting coefficient.

Note that the weighting coefficient a sets a value that is equivalent to a overlapping rate between the output timing (Tx) shown in FIG. 13 and the various timing images, for example. Also note that the weighting coefficient a changes depending on the exposure timing of the rows, so there has to be scanning line position information 217.

4. Shared Configuration Example with Other Image Processing

The present disclosure includes a method to reduce distortion resulting from focal-plane shutter operations, but by using other processing also at the same time, image quality can be further improved. Several of such configuration examples will be described.

In the example described above, in order to correct focal-plane distortion as shown in FIG. 10, processing is performed with the intermediate image generating unit to interpolate each pixel array of different exposure controls, and images are generated of the exposure patterns (first exposure pattern image 223 through fourth exposure pattern image 226) at all pixel positions.

Such processing does not cause a problem for images that are blurred due to motion that causes distortion, but a problem occurs in that, when shooting a subject that is completely still, the resolution deteriorates.

A configuration example of the distortion correcting unit 203 to reduce focal-plane distortion while preventing such resolution deterioration will be described with reference to FIG. 23.

The sensor output image 211 is an image with exposure times that differ by pixel. A gain compensation processing unit 241 performs processing to multiply the gain according to exposure time in region increments of the sensor output image 211 by the pixel values.

For a still image, an image having no resolution deterioration that is the same as the normal Bayer array can be obtained by executing the gain compensation processing. The output of the gain compensation processing unit 241 has distortion, and blurring amounts of the motion for each exposure control pattern differs, whereby in the case there is motion, image breakdown occurs.

Therefore, motion is detected by pixel or by area with the motion detecting unit 242, and with a motion adapting processing unit 243, selecting processing is performed such that an output image of the distortion correction processing unit 218 is used in a pixel region having motion, and an output image of the gain compensation processing unit 241 is used in a location having no motion, or blending processing is performed according to the motion amount. Thus, the resolution of an image having no motion is as it has been in the past, and locations having motion can reduce the distortion.

Further, portions having no motion use a frame memory to perform noise reduction processing in the temporal direction (also called three-dimensional NR or 3DNR), thereby reducing noise in the still image portions. Further, a configuration may be made which adds a pixel value saturation countermeasure processing.

In FIG. 11 described above, in order to generate the timing images 230 through 233, the difference in exposure pattern images that differ in the difference image generating units 227 through 229 is calculated, but for example in the case that the pixel value of one of the images to be subjected to difference calculation is saturated, an accurate difference value is not be obtained.

For example, in the case that the corresponding pixel values of the two images applied to generate the timing image (difference image) are originally 1200 and 800, Difference image pixel value=1200−800=400 holds true. However, in the case that the output of the sensor is 10 bit, the sensor output can only output the pixel values (0 through 1023). In this case the pixel value 2000 mentioned above is output as pixel value 1023, Difference image pixel value=1023−800=223 holds true, and a timing image (difference image) having a pixel value smaller than the actual can be generated.

As a saturation countermeasure, the simplest is to perform clipping processing with values that differ according to exposure patterns.

As shown in FIG. 11, the exposure ratio of the exposure patterns 1, 2, 3, 4 is 4:3:2:1, and in the case the pixel value output of the imaging device is 10 bit, after clipping the pixel in exposure pattern 1 with 1023, the pixel in exposure pattern 2 with 768, the pixel in exposure pattern 3 with 512, and the pixel in exposure pattern 4 with 256, the difference image generating can be performed, whereby the problem of saturation can be resolved.

Also, with another method, saturation is detected, and a difference image is not generated for the saturated portion. For this saturated portion, pixel value setting is performed by a dynamic range expanding method that is disclosed in PTL 3, for example. With such processing, for example, the distortion reduction effect is weakened, but the dynamic range can be expanded.

5. Description of Advantages of Processing of the Present Disclosure

Next, advantages of processing according to the present disclosure will be described.

Figure 24A:
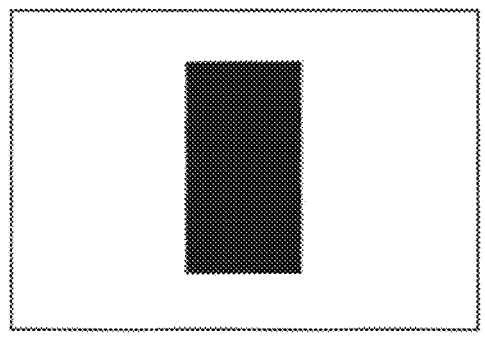
FIGS. 24A through 24C are diagrams describing an example of focal-plane distortion occurrence.
Figure 24B:
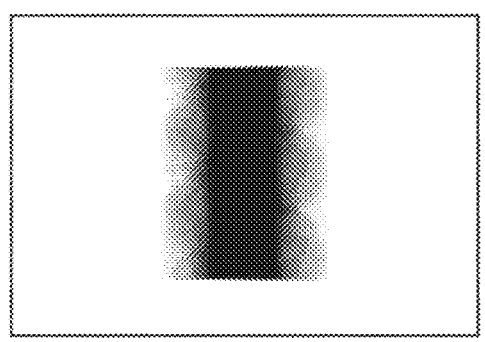
Figure 24C:
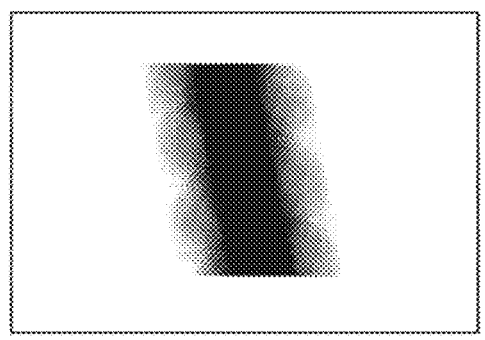

In order to show the advantages of the present disclosure, focal-plane distortion will be described with reference to FIGS. 24A through 24C. FIG. 24A is an image example at the time that a still object is imaged, and FIGS. 24B and C are image examples at the time that an object moving in the horizontal direction from left to right is imaged. FIG. 24B is an image example at the time of imaging with a global shutter (wherein focal-plane distortion does not occur), and FIG. 24C is an image example at the time of imaging with a focal-plane shutter. As shown in FIG. 24C, object distortion occurs with a focal-plane shutter operation.

As a comparison with the related art, a focal-plane distortion reduction effect with a method shown in Japanese Unexamined Patent Application Publication No. 2006-148496 (or FIG. 12A) will be shown. In the method in Japanese Unexamined Patent Application Publication No. 2006-148496, the three images shown in FIGS. 25A through 25C are used to reduce the focal-plane distortion. The difference in readout time by row is taken into consideration, a blend coefficient is computed, and one image is generated from three images.

The distortion reduction processing result from the Japanese Unexamined Patent Application Publication No. 2006-148496 is shown in FIG. 26. In FIG. 26, the position of the center of gravity of the object is adjusted, but the upper and lower edges of the screen can blur greatly, and the overall reduction effect is not great.

The focal-plane distortion reduction effect according to the present disclosure will be shown. As described with reference to FIG. 11, FIG. 12B, and FIG. 13, four exposure pattern images are generated first from one image made up of four exposure times, and four timing images equivalent to images shot with four different timings are generated as a difference image of four further exposure pattern images. The distortion correction processing unit generates a corrected image wherein the focal-plane distortion is corrected by a synthesizing processing of these timing images.

Figure 27:
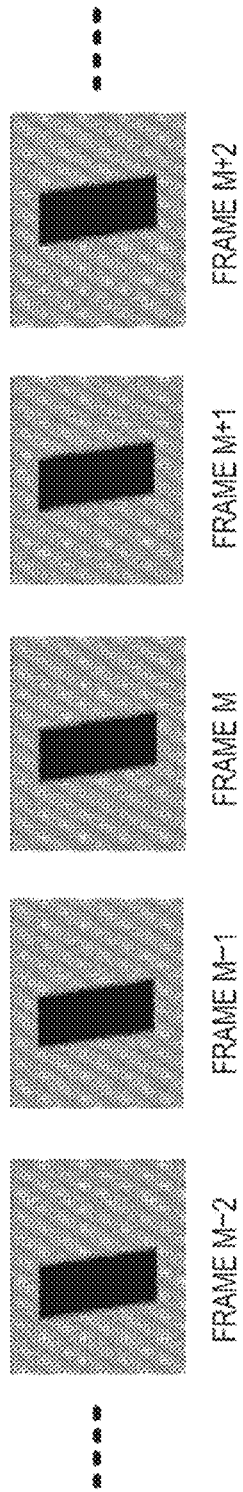
FIG. 27 is a diagram describing an image example applicable to correction processing of focal-plane distortion according to an embodiment of the present disclosure.

For example, a specific example of multiple timing images (difference images) is an image such as that shown in FIG. 27. The timing images are generated as difference images of multiple exposure pattern images, whereby the exposure period for each of the timing images is a short period, and a dark image is obtained, but many images with little blurring and a short time spacing can be obtained. The corrected image made up of the pixel values computed based on the image synthesizing processing using the image in FIG. 27, e.g. the pixel value computing processing above with reference to FIG. 13 becomes an image such as that shown in FIG. 28. That is to say, by performing reduction processing of focal-plane distortion, FIG. 28 can be obtained.

Figure 28:
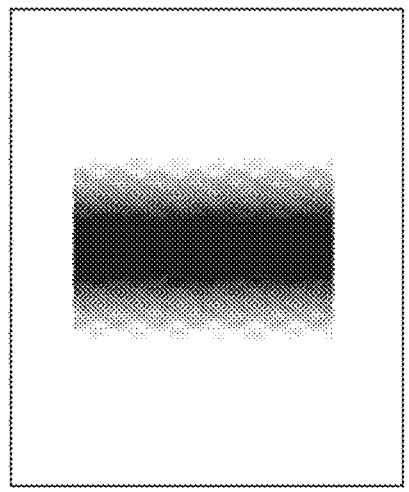
FIG. 28 is a diagram describing a correction processing example of focal-plane distortion according to an embodiment of the present disclosure.

As compared to the image shown in FIG. 26 which is the result of a method of related art, the image shown in FIG. 28 which is the result of the present disclosure can be confirmed as having an extremely small amount of irregularities in distortion reduction by the position on the screen, and as having a great distortion reduction effect.

As shown above, the image set at exposure times that differ by region is shot with an imaging device, according to the present disclosure, and with the processing applying the shot image, images that have performed focal-plane distortion correcting can be generated.

In order to obtain a similar effect with a method according to related art, a sensor has to operate at a high speed, but not with the present disclosure, so demerits such as increased power consumption that accompany an increase in operation speed of the imaging device do not occur. Also, for a similar reason, the storage apparatus serving as a frame buffer does not have to be capable of high speed operations, and power consumption and apparatus cost can be reduced.

Further, complicated computations such as motion vector calculating processing and the like do not have to be performed, so reduction of computing load and high speed processing are realized. Note that even in the case wherein the present disclosure and the motion vector are configured so as to share the computing processing, the time difference between timing images that are to be subjected to motion vector computing is small, and motion vector computing processing can be executed with high precision, whereby a highly precise distortion reduction effect can be obtained.

The present disclosure have been described above with reference to specific embodiments. However, it is obvious that one skilled in the art can make modifications and substitutions to these examples within the scope and essence of the present disclosure. That is to say, the present embodiments have been disclosed in exemplary form, and should not be interpreted in a restricted manner. In order to determine the essence of the present disclosure, the Claims should be referenced.

Also, the series of processing described in the Specification can be executed with hardware, software, or a combined configuration of both. In the case of executing a processing with software, a program having recorded a processing sequence is installed in the memory of a computer that is built in to dedicated hardware, and processing is executed, or a program is installed in a general-use computer that can execute various types of processing, and the processing is executed. For example, the program can be recorded beforehand in a recording medium. In addition to being installed from a recording medium to a computer, the program can be received via a network such as LAN (Local Area Network) or the Internet, and installed in a recording medium such as a built-in hard disk.

Note that the various types of processing described in the Specification are not only executed in a time-series manner according to the description, but may be executed in parallel or individually, according to the processing capability of the apparatus executing the processing, or as suitable. Also, a system according to the present Specification is a theoretical collective configuration of multiple apparatuses, and is not restricted to apparatuses with various configurations within the same housing.

The present disclosure contains subject matter related to that disclosed in Japanese Priority Patent Application JP 2011-038240 filed in the Japan Patent Office on Feb. 24, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system, comprising:
an imaging apparatus configured to have a plurality of pixels which are arranged in a plurality of pixel groups, wherein each pixel group of the plurality of pixel groups includes at least two pixels; and
one or more processors configured to:
generate a plurality of exposure pattern images based on each pixel signal from each pixel group of the plurality of pixel groups, wherein each pixel group of the plurality of pixel groups has different exposure times, and wherein the plurality of exposure pattern images correspond to the different exposure times; and
generate a corrected image based on synthesis of the plurality of exposure pattern images that have different exposure start times within a set interval.

2. The imaging system according to claim 1, wherein each pixel of the plurality of pixels includes a photoelectric conversion element.

3. The imaging system according to claim 1, wherein each pixel of the plurality of pixels includes a transistor element.

4. The imaging system according to claim 3, wherein the transistor element is an amplifying transistor.

5. The imaging system according to claim 3, wherein the transistor element is a select transistor.

6. The imaging system according to claim 1, wherein the one or more processors are further configured to:
generate an image based on each pixel group of the plurality of pixel groups;
input the image which has been shot with different exposure times set by region; and
generate the plurality of exposure pattern images that correspond to the different exposure times based on the input image.

7. The imaging system according to claim 6, wherein the input image is shot with a different exposure start time for each row of a plurality of rows and a different exposure duration for each pixel group of the plurality of pixel groups.

8. The imaging system according to claim 1, wherein the one or more processors are further configured to generate, from the plurality of exposure pattern images, a plurality of difference images.

9. The imaging system according to claim 8, wherein each difference image of the plurality of difference images comprises a plurality of pixels that have pixel values that are a difference between corresponding pixels of two or more of the plurality of exposure pattern images.

10. The imaging system according to claim 8, wherein the one or more processors are further configured to generate the corrected image based on synthesis of the plurality of difference images that have different exposure start times within the set interval.

* * * * *